US012315890B2

(12) United States Patent
Yamada et al.

(10) Patent No.: US 12,315,890 B2
(45) Date of Patent: May 27, 2025

(54) AQUEOUS ELECTROLYTE SOLUTION FOR ENERGY STORAGE DEVICES AND ENERGY STORAGE DEVICE COMPRISING THIS AQUEOUS ELECTROLYTE SOLUTION

(71) Applicants: THE UNIVERSITY OF TOKYO, Tokyo (JP); MITSUBISHI MATERIALS ELECTRONIC CHEMICALS CO., LTD., Akita (JP)

(72) Inventors: Atsuo Yamada, Tokyo (JP); Yuki Yamada, Tokyo (JP); Seongjae Ko, Tokyo (JP); Shota Miura, Tokyo (JP); Takeshi Kamiya, Akita (JP); Tsunetoshi Honda, Tokyo (JP); Jun Akikusa, Tokyo (JP)

(73) Assignees: THE UNIVERSITY OF TOKYO, Tokyo (JP); MITSUBISHI MATERIALS ELECTRONIC CHEMICALS CO., LTD., Akita (JP)

( * ) Notice: Subject to any disclaimer, the term of this patent is extended or adjusted under 35 U.S.C. 154(b) by 602 days.

(21) Appl. No.: 17/439,605

(22) PCT Filed: Mar. 9, 2020

(86) PCT No.: PCT/JP2020/009933
§ 371 (c)(1),
(2) Date: Sep. 15, 2021

(87) PCT Pub. No.: WO2020/189361
PCT Pub. Date: Sep. 24, 2020

(65) Prior Publication Data
US 2022/0158254 A1    May 19, 2022

(30) Foreign Application Priority Data

Mar. 19, 2019  (JP) ................................ 2019-051517
Mar. 19, 2019  (JP) ................................ 2019-051518
Mar. 19, 2019  (JP) ................................ 2019-051519

(51) Int. Cl.
*H01M 10/36*  (2010.01)
*H01G 11/62*  (2013.01)

(52) U.S. Cl.
CPC ............. *H01M 10/36* (2013.01); *H01G 11/62* (2013.01); *H01M 2300/0002* (2013.01)

(58) Field of Classification Search
CPC ........... H01M 10/24–26; H01M 10/36; H01M 10/38; H01M 2300/00–0002;
(Continued)

(56) References Cited

U.S. PATENT DOCUMENTS 5,652,072 A * 7/1997 Lamanna .......... H01M 10/0568
429/307
5,691,081 A   11/1997 Krause et al.
(Continued)

FOREIGN PATENT DOCUMENTS

CN    104508897 A    4/2015
EP    1380569 A1    1/2004
(Continued)

OTHER PUBLICATIONS

OA for KR App. No. 10-2021-7027402, dated Nov. 1, 2023 (w/ translation).
(Continued)

*Primary Examiner* — Jonathan Crepeau
*Assistant Examiner* — Jacob Buchanan
(74) *Attorney, Agent, or Firm* — Greenblum & Bernstein, P.L.C.

(57) ABSTRACT

According to the present invention, an electrolyte is composed of one or more lithium salts of asymmetric imides each having a perfluoroalkyl group, or a mixed salt of a lithium salt of an asymmetric imide having a perfluoroalkyl
(Continued)

group and a lithium salt of a symmetric imide having a perfluoroalkyl group. The composition ratio of the one or more lithium salts and the mixed salt is expressed by (lithium salt of asymmetric imide)$_x$(lithium salt of symmetric imide)$_{1-x}$ (wherein x is from 0.1 to 1.0) in terms of the molar ratio; the asymmetric imide lithium salt is $(C_2F_5SO_2)(CF_3SO_2)NLi$ or $(C_3F_7SO_2)(CF_3SO_2)NLi$; the symmetric imide lithium salt is $(CF_3SO_2)_2NLi$; and the composition of an electrolyte solution according to the present invention contains 1.0 mole or more but less than 2 moles of a solvent per 1 mole of the one or more lithium salts or the lithium salts of the mixed salt.

5 Claims, 5 Drawing Sheets

(58) Field of Classification Search
CPC ........ H01G 11/00; H01G 11/06; H01G 11/20; H01G 11/54; H01G 11/58–64
See application file for complete search history.

(56) References Cited

U.S. PATENT DOCUMENTS

| | | | | |
|---|---|---|---|---|
| 2002/0197537 | A1* | 12/2002 | Kim | H01M 10/0567 429/340 |
| 2009/0053612 | A1* | 2/2009 | Ihara | C07C 309/86 429/340 |
| 2013/0068991 | A1* | 3/2013 | Sato | H01G 9/035 423/386 |
| 2015/0118579 | A1* | 4/2015 | Kondo | H01M 10/0567 429/337 |
| 2015/0318530 | A1* | 11/2015 | Yushin | H01M 10/36 429/131 |
| 2017/0033345 | A1* | 2/2017 | Kakeya | H01M 10/24 |
| 2017/0373351 | A1* | 12/2017 | Kawai | H01M 10/26 |
| 2019/0036151 | A1 | 1/2019 | Takechi et al. | |
| 2020/0274200 | A1* | 8/2020 | Koyama | H01M 10/0569 |

FOREIGN PATENT DOCUMENTS

| | | |
|---|---|---|
| EP | 1950779 A1 | 7/2008 |
| JP | H11-512563 A | 10/1999 |
| JP | 2005-100826 A | 4/2005 |
| JP | 2008-222657 A | 9/2008 |
| JP | 2011-81146 A | 4/2011 |
| JP | 2012-54208 A | 3/2012 |
| JP | 5256649 B2 | 8/2013 |
| JP | 2013-251066 A | 12/2013 |
| JP | 2015-535789 A | 12/2015 |
| JP | 2018-106911 A | 7/2018 |
| JP | 2018-137107 A | 8/2018 |
| TW | 201521061 A | 6/2015 |
| WO | WO 97/11504 A1 | 3/1997 |
| WO | WO 2011/149095 A1 | 12/2011 |
| WO | WO 2016/114141 A1 | 7/2016 |

OTHER PUBLICATIONS

Kubota et al., "Cation Mixtures of Alkali Metal (Fluorosulfonyl)(trifluoromethylsulfonyl)Amide as Electrolytes for Lithium Secondary Battery", Journal of The Electrochemical Society, 161(6):A902-A907 (2014).
ISR for PCT/JP2020/009933, dated Jun. 9, 2020.
Written Opinion for PCT/JP2020/009933, dated Jun. 9, 2020.
OA for JP App. No. 2019-051517, dated Feb. 14, 2023 (w/ translation).
OA for JP App. No. 2019-051518, dated Feb. 14, 2023 (w/ translation).
OA for JP App. No. 2019-051519, dated Feb. 14, 2023 (w/ translation).
ESR for EP App. No. 20774137.2, dated Nov. 28, 2022.
OA for TW App. No. 109108900, dated Jul. 5, 2023 (w/ translation of Search Report).
Office Action for CN App No. 202080022264.0, dated Jan. 22, 2025 (w/ translation of search report).

* cited by examiner

[Fig. 1]
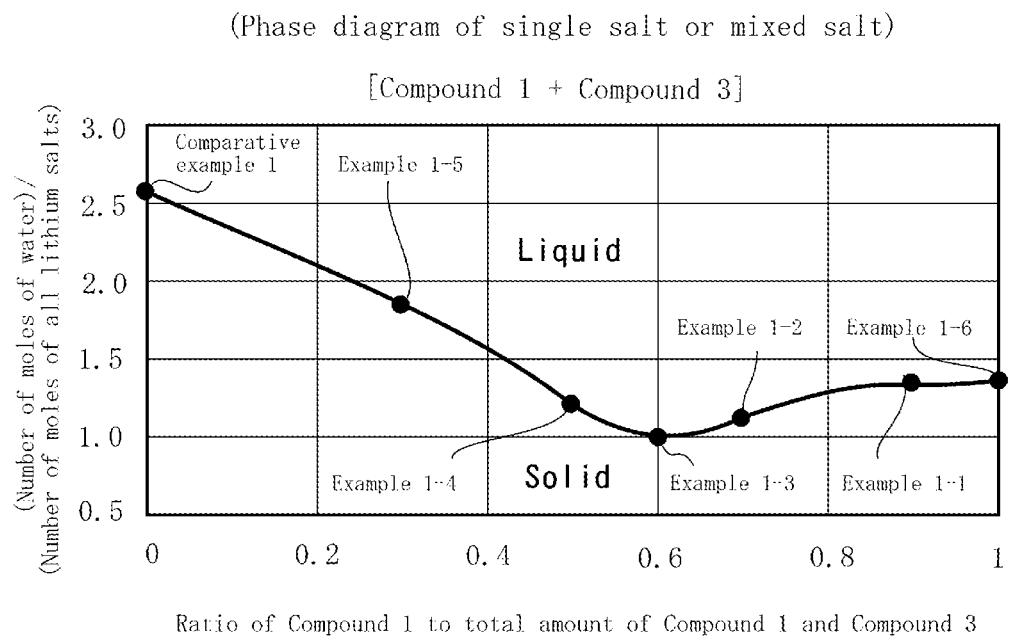
[Fig. 2]
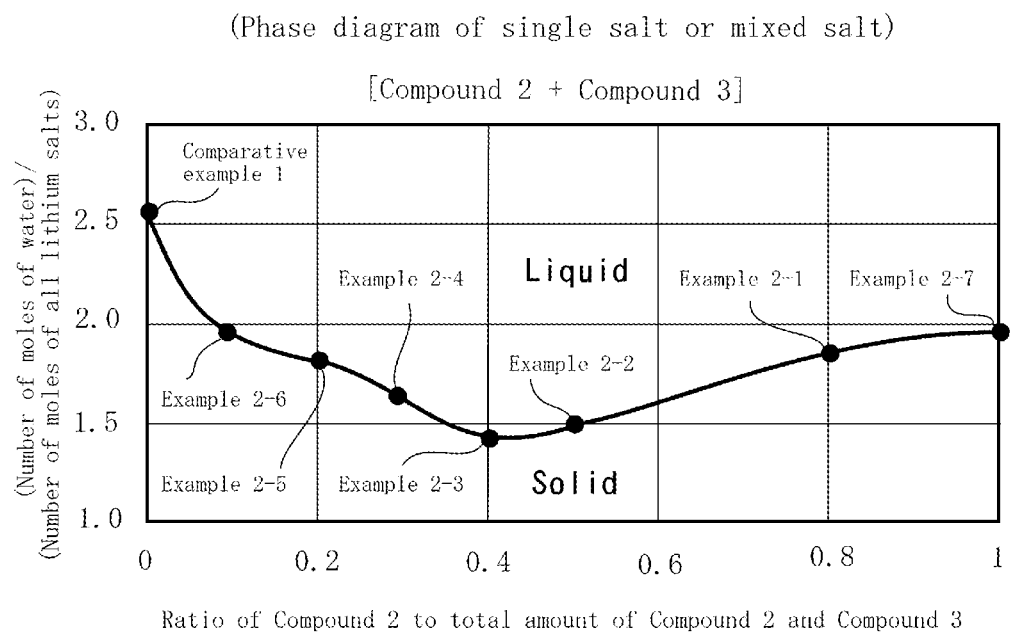

[Fig. 3]
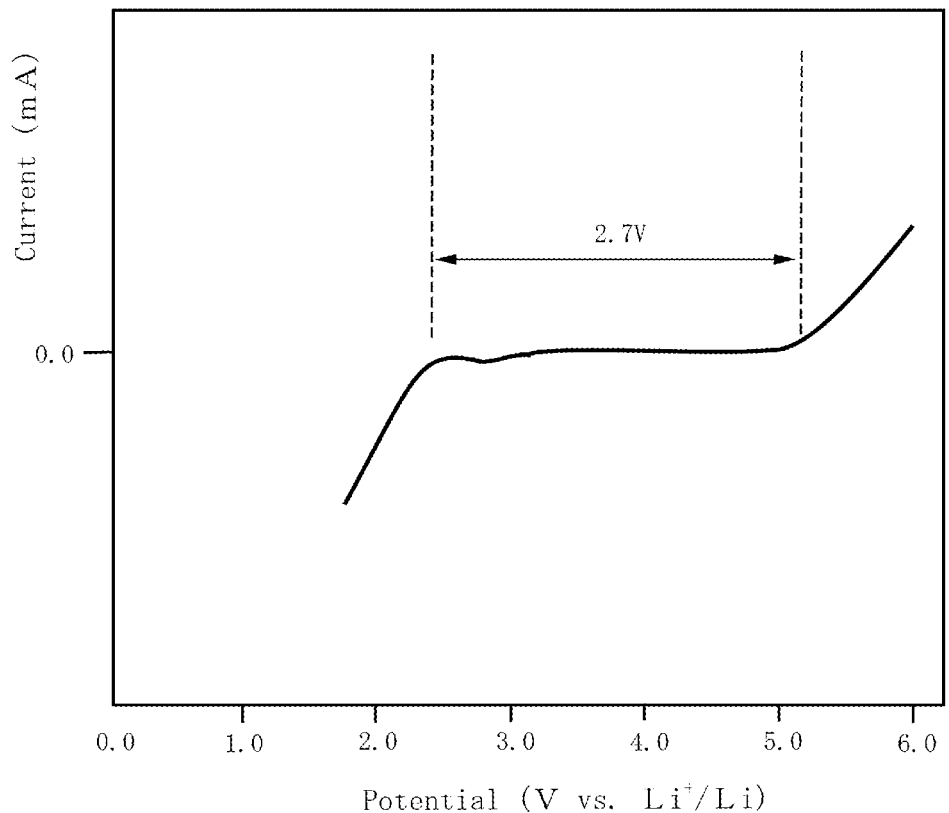
[Fig. 4]
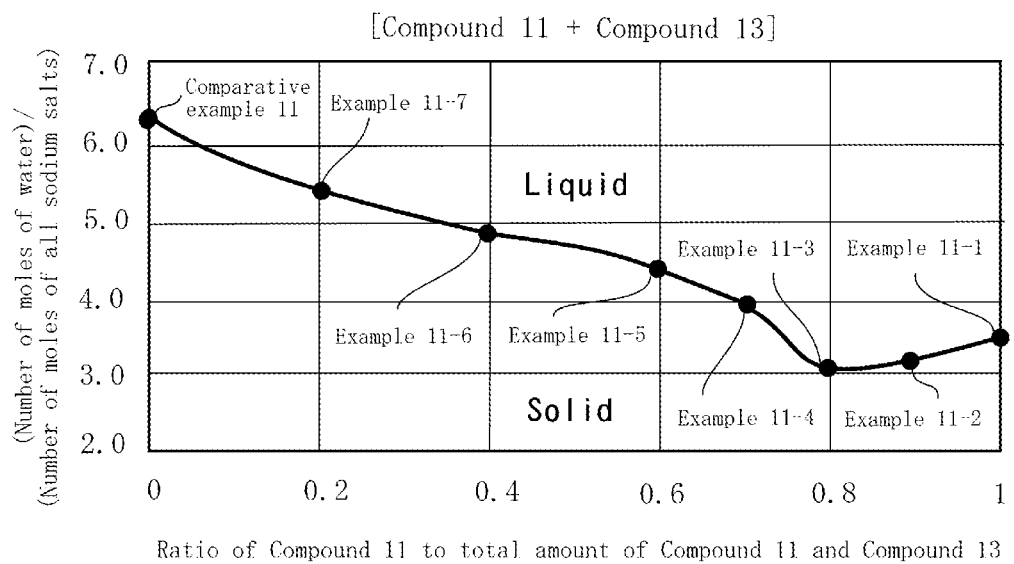

[Fig. 5]
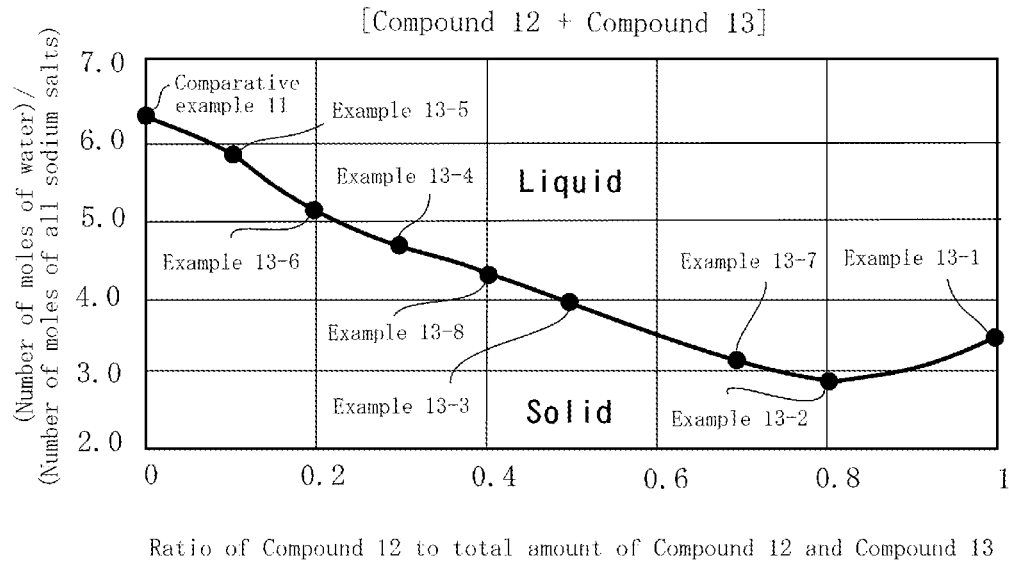
[Fig. 6]
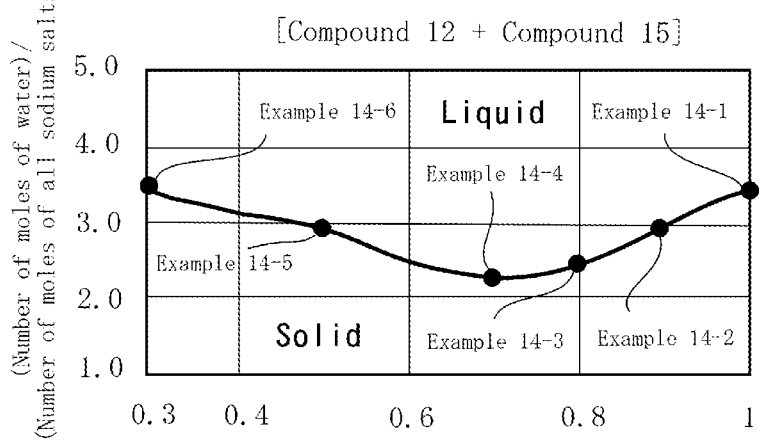

[Fig. 7]
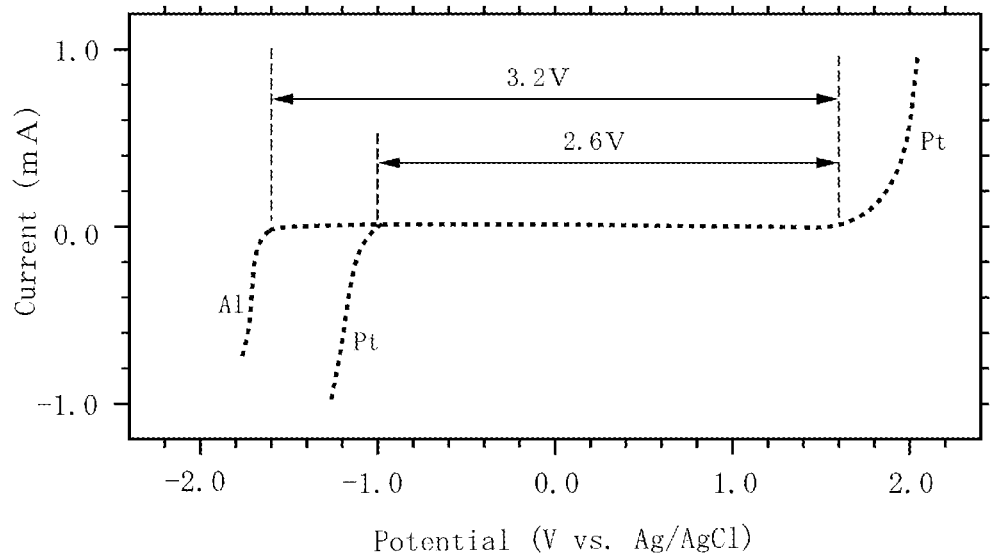
[Fig. 8]
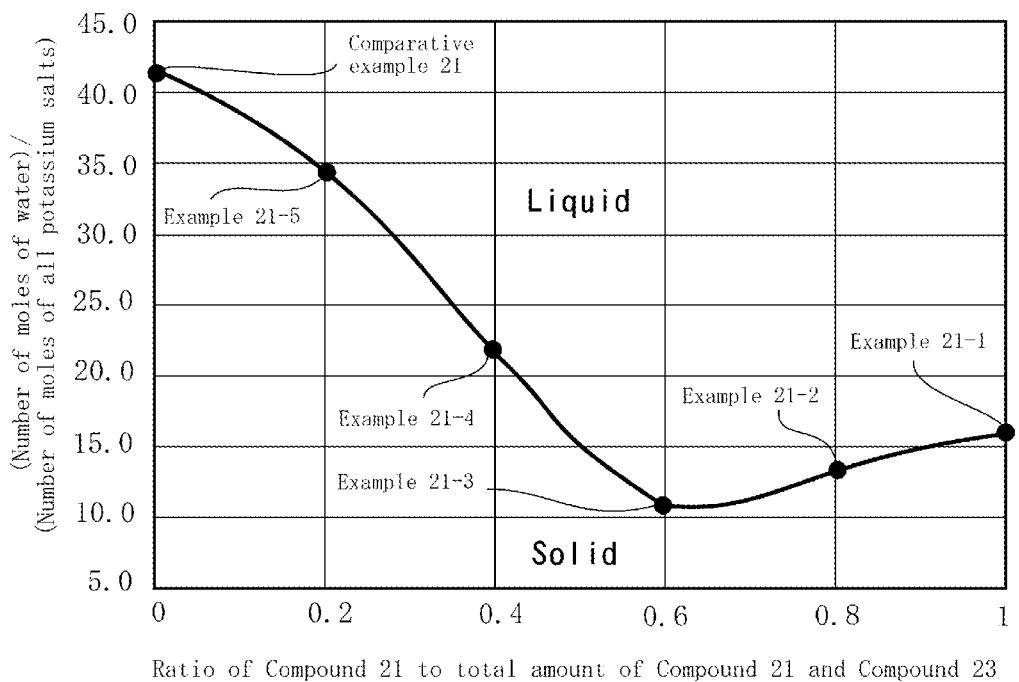

【Fig. 9】
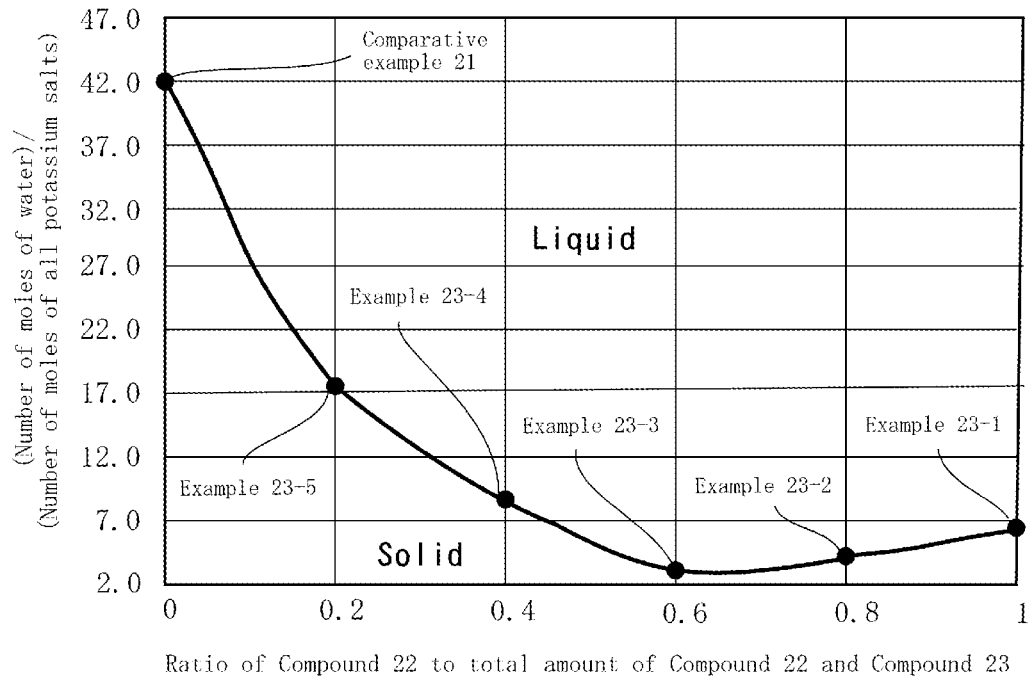
【Fig. 10】
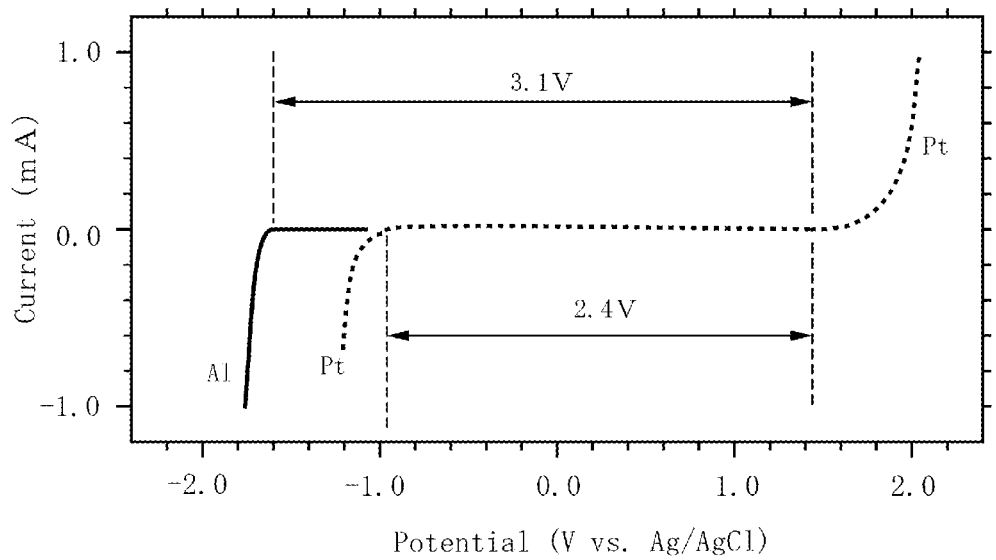

AQUEOUS ELECTROLYTE SOLUTION FOR ENERGY STORAGE DEVICES AND ENERGY STORAGE DEVICE COMPRISING THIS AQUEOUS ELECTROLYTE SOLUTION

TECHNICAL FIELD

The present invention relates to a nonflammable aqueous electrolyte solution for an energy storage device and an energy storage device comprising this aqueous electrolyte solution. This international application claims priority based on Japanese Patent Application No. 2019-51517, Japanese Patent Application No. 2019-51518 and Japanese Patent Application No. 2019-51519, which were filed on Mar. 19, 2019, respectively, and the entire contents of Japanese Patent Application No. 2019-51517, Japanese Patent Application No. 2019-51518 and Japanese Patent Application No. 2019-51518 2019-51519 are incorporated in this international application.

BACKGROUND ART

At present, non-aqueous electrolyte solutions have been used in lithium-ion batteries which are put into practical use in the fields related to information and communication equipment such as personal computers, mobile phones, etc. This non-aqueous electrolyte solution is flammable, so that a lithium ion battery using a non-flammable aqueous electrolyte solution is required. However, in a lithium ion battery using an aqueous electrolyte, there is a problem that it is difficult to realize a high voltage due to electrolysis of water.

As a conventional aqueous electrolyte solution of this type, an electrolyte solution in an aqueous solution obtained by dissolving a lithium salt in water has been known (see Patent Document 1 (Claim 1, paragraph [0018] and paragraph [0049])). In Patent Document 1, it has been disclosed that, in the aqueous lithium secondary battery of this invention, by using a titanium pyrophosphate compound having the compositional formula of $(TiO)_2P_2O_7$ as a main component of a negative electrode active material, insertion and desorption of Li can be stably carried out in an aqueous solution and also insertion and desorption of Li can be carried out at a very low electrical potential of about 2.2 V with regard to the $Li^+/Li$ electrode, and this electrical potential of 2.2 V is very close to the limit potential for not generating hydrogen when a hydrogen generation overvoltage is considered so that, in this aqueous lithium secondary battery, it is possible to make the battery voltage relatively high whereby a high output battery can be realized, and this aqueous lithium secondary battery can be relatively stably carried out charging and discharging repeatedly and can suppress decrease in capacity when the charging and discharging are repeated to improve a capacity retention rate. Further, in Example 2 of Patent Document 1, the aqueous lithium battery contains a $LiNO_3$ aqueous solution having a concentration of 6 mol/L as an electrolyte solution in an aqueous solution.

Further, conventionally, as an energy storage device containing this kind of aqueous electrolyte solution, an aqueous solution-based secondary battery in which sodium is dissolved has been disclosed (for example, see Patent Document 2 (Claim 1, paragraph [0019])). In Patent Document 2, there are disclosed that this aqueous solution-based secondary battery is provided with a positive electrode containing a positive electrode active material capable of occluding and releasing sodium, a negative electrode containing a negative electrode active material capable of occluding and releasing sodium, and an electrolyte solution interposed between the positive electrode and the negative electrode, which contains a buffer substance that exhibits a buffering action against change in pH and is an aqueous solution in which sodium is dissolved, and a battery voltage of about 1.25 V can be obtained.

Further, it has been disclosed a secondary battery which contains, as the aqueous electrolyte, sodium ions having a concentration of 3 mol/L or more and at least one kind of a first anion selected from the group consisting of [N(FSO$_2$)$_2$]$^-$, SO$_3^{2-}$, S$_2$O$_3^{2-}$ and SCN$^-$ (see Patent Document 3 (paragraph [0008] and paragraph [0012])). In Patent Document 3, it has been described that the first anion has a smaller molecular weight and higher solubility in an aqueous solvent as compared with an organic anion having a fluoroalkyl group, so that the Na ion concentration which is an aqueous electrolyte could be 3 mol/L or more, and as a result, the ionic conductivity of the aqueous electrolyte can be improved and the hydrogen generation overvoltage can be increased.

Further, conventionally, a potassium ion battery has been proposed as an energy storage device in place of the lithium ion battery (see, for example, Patent Document 4 (Claims 1 to 3, paragraph [0010] and paragraph [0036])). This potassium ion battery is provided with a positive electrode for a potassium ion battery which contains a positive active material for the potassium ion battery containing a compound represented by the formula (1) of $K_mFe_xMn_y(CN)_6 \cdot zH_2O$ (in the formula (1), m represents a number of 0.5 or more and 2 or less, x represents a number of 0.5 or more and 1.5 or less, y represents a number of 0.5 or more and 1.5 or less, and z represents 0 or a positive number.).

Since this potassium ion battery is provided with a positive electrode for a potassium ion battery containing the positive electrode active material for the potassium ion battery, it is said that it has a characteristic of high energy density. In this potassium ion battery, an aqueous electrolyte solution and a non-aqueous electrolyte solution are exemplified as the electrolyte solution as the electrolyte, and in the case of the aqueous electrolyte solution, there are mentioned, as potassium salts, $KClO_4$, $KPF_6$, $KNO_3$, KOH, KCl, $K_2SO_4$, $K_2S$, etc.

On the other hand, it has been disclosed that an electrolyte solution for an energy storage device containing water as a solvent, wherein the composition of the electrolyte solution comprises 4 mole or less of a solvent amount per 1 mole of an alkali metal salt, and the alkali metal salt is a lithium salt or a sodium salt (see Patent Document 5 (Claim 1, paragraph [0028], paragraph [0087] and Claim 6)). It has been shown in Patent Document 5 that the electrolyte solution for an energy storage device has a potential window that exceeds the potential window (stable potential region) of pure water by using such a high-concentration alkali metal salt, preferably it has a potential window of 2 V or more, and in Examples thereof, the potential window of the electrolyte solution No. 4 is calculated to be 3.2 V.

PRIOR ART DOCUMENT

Patent Document

Patent Document 1: JP Patent No. 5,256,649C
Patent Document 2: JP 2012-54208A
Patent Document 3: JP 2018-137107A
Patent Document 4: JP 2018-106911A
Patent Document 5: WO 2016/114141A

DISCLOSURE OF INVENTION

Problem to be Solved by the Invention

The electrolyte solution of Patent Document 1 is a $LiNO_3$ aqueous solution with a concentration of 6 mol/L, and a proportion of water is large, so that there are problems that electrolysis of water is unavoidable in an aqueous lithium battery, and the Coulomb efficiency (charge/discharge efficiency) of the lithium battery is lowered. Also, the electrolyte solution of Patent Document 5 is characterized in that the composition thereof is 4 mole or less of an amount of the solvent per 1 mole of the alkali metal salt, but in Examples thereof, from Table 1, Table 2 and FIG. 16 and FIG. 17, the number of moles of water, which is a solvent, based on the number of moles of the alkali metal salt, that is, (number of mole of water)/(number of mole of alkali metal salt) is 2 moles (No. 4) to 2.73 mole (No. 6), so that at least 2 moles of water is required per 1 mole of the lithium salt. For this reason, electrolysis of water is still observed in lithium batteries, and there are still problems to be solved from the viewpoint of further improving the coulombic efficiency of lithium batteries.

In the aqueous solution-based secondary battery of Patent Document 2, it is limited to 1.2 V which is the decomposition voltage of water, so that the obtained battery voltage is 1.25 V. Even when the overvoltage is taken into consideration, 1.7 V is the limit for the aqueous solution-based battery, so that an energy storage device capable of generating a higher voltage and a high capacity cannot be realized. Also, in Patent Document 5, an alkali metal salt which is a lithium salt or a sodium salt is shown as the composition of the electrolyte solution, but there is no description of an example of the sodium salt. Further, in the secondary battery of Patent Document 3, since the withstand voltage is realized by increasing the hydrogen generation overvoltage, the electrolysis of water cannot completely be suppressed, and there was a problem that the Coulomb efficiency is low as compared with the case where an organic alkali salt is used.

Further, in the potassium ion battery using the above-mentioned aqueous electrolyte solution containing the potassium salt shown in Patent Document 4, since it is limited to 1.2 V which is the decomposition voltage of water, there is a problem that an energy storage device having a high voltage and capacity cannot be realized. Also, in Patent Document 4, in the examples and comparative examples, the aqueous electrolyte solution is not shown, and only the non-aqueous electrolyte solution is shown. Further, in Patent Document 5, an alkali metal salt which is a lithium salt or a sodium salt as the composition of the electrolyte solution, but there is no description about the potassium salt.

An object of the present invention is to provide an aqueous electrolyte solution for an energy storage device capable of increasing the Coulomb efficiency of the energy storage device, and an energy storage device containing this aqueous electrolyte solution.

Means for Solving Problem

The present inventors have found out that one kind or two or more kinds of lithium salts of asymmetric imides having a specific perfluoroalkyl group, or a mixed salt of a lithium salt of asymmetric imides having a specific perfluoroalkyl group and a lithium salt of symmetric imides having a specific perfluoroalkyl group is/are used as the electrolyte of the aqueous electrolyte solution, the above-mentioned one kind or two or more kinds of lithium salts or mixed salt become an aqueous solution even if the amount of water is less than 2 moles per 1 mole of the lithium salt, and electrolysis of water is suppressed even when water is used, whereby they have reached the present invention.

In addition, the present inventors have found out that one kind or two or more kinds of sodium salts of asymmetric imides having a specific perfluoroalkyl group, a mixed salt of a sodium salt of asymmetric imides having a specific perfluoroalkyl group and a sodium salt of symmetric imides having a specific perfluoroalkyl group, or a mixed salt of these sodium salts and a specific sodium salt of sulfonic acid is/are used as the electrolyte of the aqueous electrolyte solution, the above-mentioned one kind or two or more kinds of the sodium salts or mixed salt become an aqueous solution even if it is a low water ratio, and electrolysis of water is suppressed even when water is used, whereby they have reached the present invention.

Further, the present inventors have found out that one kind or two or more kinds of potassium salts of asymmetric imides having a specific perfluoroalkyl group, a mixed salt of a potassium salt of asymmetric imides having a specific perfluoroalkyl group and a potassium salt of symmetric imides having a specific perfluoroalkyl group, or a mixed salt of these potassium salts and a specific sulfonic acid potassium salt is/are used as the electrolyte of the aqueous electrolyte solution, and even if in the potassium having a relatively large ion radius, the above-mentioned one kind or two or more kinds of potassium salts or mixed salt become an aqueous solution in a range of an amount of the solvent of 2 moles or more and less than 40 moles per 1 mole of the potassium salt, and electrolysis of water is suppressed even when water is used, whereby they have reached the present invention.

In the present specification, "asymmetric imide" means an imide whose composition is not symmetric in structure, and "symmetric imide" means an imide whose composition is symmetric in structure.

A first aspect of the present invention is that in an aqueous electrolyte solution for an energy storage device containing water as a solvent, characterized in that an electrolyte is one kind or two or more kinds of lithium salts of an asymmetric imide having a perfluoroalkyl group, or a mixed salt of the above-mentioned lithium salt of an asymmetric imide having a perfluoroalkyl group and a lithium salt of a symmetric imide having a perfluoroalkyl group, and a composition ratio of the above-mentioned one kind or two or more kinds of the lithium salts and the above-mentioned mixed salt is, in a molar ratio, (lithium salt of asymmetric imide)$_x$(lithium salt of symmetric imide)$_{1-x}$(where x is 0.1 to 1.0.), and the above-mentioned asymmetric imide lithium salt is lithium (pentafluoroethanesulfonyl) (trifluoromethanesulfonyl)-imide (($C_2F_5SO_2$)($CF_3SO_2$)NLi, hereinafter referred to as "Compound 1") or lithium (heptafluoropropanesulfonyl)-(trifluoromethanesulfonyl)imide (($C_3F_7SO_2$)($CF_3SO_2$)NLi, hereinafter referred to as "Compound 2"), and the above-mentioned symmetric imide lithium salt is lithium bis(trifluoromethanesulfonyl)imide (($CF_3SO_2$)$_2$NLi, hereinafter referred to as "Compound 3"), and a composition of the electrolyte solution is 1.0 mole or more and less than 2 moles of an amount of the solvent per 1 mole of the above-mentioned one kind or two or more kinds of the lithium salts or the lithium salts of the above-mentioned mixed salt.

A second aspect of the present invention is that in an aqueous electrolyte solution for an energy storage device containing water as a solvent, characterized in that an electrolyte is one kind or two or more kinds of sodium salts of an asymmetric imide having a perfluoroalkyl group, a mixed salt of the above-mentioned sodium salt of an asymmetric imide and a sodium salt of a symmetric imide having a perfluoroalkyl group, or a mixed salt of the above-mentioned sodium salt of an asymmetric imide, the above-mentioned sodium salt of a symmetric imide and a sodium salt of sulfonic acid having a perfluoroalkyl group, a composition ratio of the above-mentioned one kind or two or more kinds of sodium salts and the above-mentioned mixed salt is, in a molar ratio, (sodium salt of asymmetric imide)$_x$ (sodium salt of symmetric imide)$_y$(sodium salt of sulfonic acid)$_{1-(x+y)}$ (where x is 0.1 to 1.0, y is 0 to 0.9 and x+y≤1.0).), and the above-mentioned asymmetric imide sodium salt is sodium (pentafluoroethanesulfonyl) (trifluoromethanesulfonyl)-imide (($C_2F_5SO_2$)($CF_3SO_2$)NNa, hereinafter referred to as "Compound 11"), sodium (heptafluoropropanesulfonyl)-(trifluoromethanesulfonyl)imide (($C_3F_7SO_2$)($CF_3SO_2$)NNa, hereinafter referred to as "Compound 12") or sodium (nonafluorobutanesulfonyl)(trifluoromethanesulfonyl)-imide (($C_4F_9SO_2$)($CF_3SO_2$)NNa, hereinafter referred to as "Compound 14".), and the above-mentioned symmetric imide sodium salt is sodium bis(trifluoromethanesulfonyl) imide (($CF_3SO_2$)$_2$NNa), hereinafter referred to as "Compound 13") or sodium bis(pentafluoroethanesulfonyl)imide (($C_2F_5SO_2$)$_2$NNa), hereinafter referred to as "Compound 15"), the sodium salt of sulfonic acid is sodium trifluoromethanesulfonate ($CF_3SO_3Na$, hereinafter referred to as "Compound 18"), and a composition of the electrolyte solution is 2 moles or more and less than 6 moles of an amount of the solvent per 1 mole of the above-mentioned one kind or two or more kinds of sodium salts or the sodium salts of the above-mentioned mixed salt.

A third aspect of the present invention is that in an aqueous electrolyte solution for an energy storage device containing water as a solvent, characterized in that an electrolyte is one kind or two or more kinds of potassium salts of an asymmetric imide having a perfluoroalkyl group, a mixed salt of the above-mentioned potassium salt of an asymmetric imide and a potassium salt of a symmetric imide having a perfluoroalkyl group, or a mixed salt of the above-mentioned potassium salt of an asymmetric imide, the above-mentioned potassium salt of a symmetric imide and a sulfonic acid potassium salt having a perfluoroalkyl group, a composition ratio of the above-mentioned one kind or two or more kinds of the potassium salts and the above-mentioned mixed salt is, in a molar ratio, (potassium salt of asymmetric imide)$_x$(potassium salt of symmetric imide)$_y$ (sulfonic acid potassium salt)$_{1-(x+y)}$ (where x is 0.1 to 1.0, y is 0 to 0.9 and x+y≤1.0).), and the above-mentioned asymmetric imide potassium salt is potassium (pentafluoroethanesulfonyl)-(trifluoromethanesulfonyl)imide (($C_2F_5SO_2$) ($CF_3SO_2$)NK, hereinafter referred to as "Compound 21"), potassium (heptafluoropropanesulfonyl)(trifluoromethanesulfonyl)-imide (($C_3F_7SO_2$)($CF_3SO_2$)NK, hereinafter referred to as "Compound 22") or potassium (nonafluorobutanesulfonyl)-(trifluoromethanesulfonyl)imide (($C_4F_9SO_2$) ($CF_3SO_2$)NK, hereinafter referred to as "Compound 24".), and the above-mentioned symmetric imide potassium salt is potassium bis(trifluoromethanesulfonyl)imide (($CF_3SO_2$)$_2$ NK, hereinafter referred to as "Compound 23") or potassium bis(pentafluoroethanesulfonyl)imide (($C_2F_5SO_2$)$_2$NK), hereinafter referred to as "Compound 25"), the potassium sulfonate salt is potassium trifluoromethanesulfonate ($CF_3SO_3K$, hereinafter referred to as "Compound 28"), and a composition of the electrolyte solution is 2 moles or more and less than 40 moles of an amount of the solvent per 1 mole of the potassium salt of the above-mentioned one kind or two or more kinds of the potassium salts or the potassium salts of the above-mentioned mixed salt.

A fourth aspect of the present invention is an invention based on the first aspect, which is an aqueous electrolyte solution for an energy storage device in which the melting point of the above-mentioned one kind or two or more kinds of the lithium salts is 230° C. or lower.

A fifth aspect of the present invention is an invention based on the second aspect, which is an aqueous electrolyte solution for an energy storage device in which the melting point of the above-mentioned one kind or two or more kinds of the sodium salts is 240° C. or lower.

A sixth aspect of the present invention is an invention based on the third aspect, which is an aqueous electrolyte solution for an energy storage device in which the melting point of the above-mentioned one kind or two or more kinds of the potassium salts is 230° C. or lower.

A seventh aspect of the present invention is the invention based on the first or fourth aspect, which is an aqueous electrolyte for an energy storage device in which a fluorine ion content in the aqueous electrolyte solution is 10 ppm or less and a hydrogen content in the above-mentioned aqueous electrolyte solution is 10 ppm or less. Here, the fluorine ions in the aqueous electrolyte solution are fluorine ions remaining without completely removing the side reaction products generated during the production of the lithium salt, and/or fluorine ions mixed by the decomposition of the reaction products, and are derived from an imide lithium salt. In addition, the hydrogen in the aqueous electrolyte solution is a hydrogen atom which remains in the molecule of the imide lithium salt where the lithium salt is not completely fluorinated.

An eighth aspect of the present invention is the invention based on the second or fifth aspect, which is an aqueous electrolyte for an energy storage device in which a fluorine ion content in the aqueous electrolyte solution is 10 ppm or less and a hydrogen content in the aqueous electrolyte solution is 10 ppm or less. Here, the fluorine ions in the aqueous electrolyte are fluorine ions remaining without completely removing the side reaction products generated during the production of the sodium salt, and/or fluorine ions mixed by the decomposition of the reaction products, and are derived from an imide sodium salt. In addition, the hydrogen in the aqueous electrolyte solution is a hydrogen atom which remains in the molecule of the imide sodium salt where the sodium salt is not completely fluorinated.

A ninth aspect of the present invention is the invention based on the third or sixth aspect, which is an aqueous electrolyte for an energy storage device in which a fluorine ion content in the aqueous electrolyte solution is 10 ppm or less and a hydrogen content in the above-mentioned aqueous electrolyte solution is 10 ppm or less. Here, the fluorine ions in the aqueous electrolyte solution are fluorine ions remaining without completely removing the side reaction products generated during the production of the potassium salt, and/or fluorine ions mixed by the decomposition of the reaction products, and are derived from an imide potassium salt. In addition, the hydrogen in the aqueous electrolyte solution is a hydrogen atom which remains in the molecule of the imide potassium salt where the potassium salt is not completely fluorinated.

A tenth aspect of the present invention is an invention based on the first or fourth aspect, which is an aqueous electrolyte for an energy storage device wherein the energy storage device is a lithium ion secondary battery, an electric double layer capacitor or a lithium ion capacitor.

An eleventh aspect of the present invention is an invention based on the second or fifth aspect, which is an aqueous electrolyte for an energy storage device wherein the energy storage device is a sodium ion secondary battery, an electric double layer capacitor or a sodium ion capacitor.

A twelfth aspect of the present invention is an invention based on the third or sixth aspect, which is an aqueous electrolyte for an energy storage device wherein the energy storage device is a potassium ion secondary battery, an electric double layer capacitor or a potassium ion capacitor.

A thirteenth aspect of the present invention is one kind or two or more kinds of lithium salts of an asymmetric imide having a perfluoroalkyl group of the first aspect, which is used as an electrolyte of the aqueous electrolyte solution for an energy storage device according to the first or fourth aspect, and has a fluorine ion content of 10 ppm or less and a hydrogen content of 10 ppm or less.

A fourteenth aspect of the present invention is one kind or two or more kinds of sodium salts of an asymmetric imide having a perfluoroalkyl group of the second aspect, which is used as an electrolyte of the aqueous electrolyte solution for an energy storage device according to the second or fifth aspect, and has a fluorine ion content of 10 ppm or less and a hydrogen content of 10 ppm or less.

A fifteenth aspect of the present invention is one kind or two or more kinds of potassium salts of an asymmetric imide having a perfluoroalkyl group of the third aspect, which is used as an electrolyte of the aqueous electrolyte solution for an energy storage device according to the third or sixth aspect, and has a fluorine ion content of 10 ppm or less and a hydrogen content of 10 ppm or less.

A sixteenth aspect of the present invention is a mixed salt of the lithium salt of an asymmetric imide having a perfluoroalkyl group of the first aspect and the lithium salt of a symmetric imide having a perfluoroalkyl group of the first aspect, which is used as an electrolyte of the aqueous electrolyte solution for an energy storage device according to the first or fourth aspect, and has a fluorine ion content of 10 ppm or less and a hydrogen content of 10 ppm or less.

A seventeenth aspect of the present invention is a mixed salt of the sodium salt of an asymmetric imide having a perfluoroalkyl group of the second aspect and the sodium salt of a symmetric imide having a perfluoroalkyl group of the second aspect, which is used as an electrolyte of the aqueous electrolyte solution for an energy storage device according to the second or fifth aspect, and has a fluorine ion content of 10 ppm or less and a hydrogen content of 10 ppm or less.

An eighteenth aspect of the present invention is a mixed salt of the potassium salt of an asymmetric imide having a perfluoroalkyl group of the third aspect and the potassium salt of a symmetric imide having a perfluoroalkyl group of the third aspect, which is used as an electrolyte of the aqueous electrolyte solution for an energy storage device according to the third or sixth aspect, and has a fluorine ion content of 10 ppm or less and a hydrogen content of 10 ppm or less.

A nineteenth aspect of the present invention is a mixed salt of the sodium salt of an asymmetric imide having a perfluoroalkyl group of the second aspect, the sodium salt of a symmetric imide having a perfluoroalkyl group of the second aspect and the sodium salt of sulfonic acid having a perfluoroalkyl group of the third second aspect, which is used as an electrolyte of the aqueous electrolyte solution for an energy storage device according to the second or fifth aspect, and has a fluorine ion content of 10 ppm or less and a hydrogen content of 10 ppm or less.

A twentieth aspect of the present invention is a mixed salt of the potassium salt of an asymmetric imide having a perfluoroalkyl group of the third aspect, the potassium salt of a symmetric imide having a perfluoroalkyl group of the third aspect and the sulfonic acid potassium salt having a perfluoroalkyl group of the third aspect, which is used as an electrolyte of the aqueous electrolyte solution for an energy storage device according to the third or sixth aspect, and has a fluorine ion content of 10 ppm or less and a hydrogen content of 10 ppm or less.

A twenty-first aspect of the present invention is an energy storage device containing an aqueous electrolyte solution according to any one of the first to sixth aspects.

Effect of the Invention

In the aqueous electrolyte solution for an energy storage device according to the first aspect of the present invention, as the electrolyte of the aqueous electrolyte solution, one kind or two or more kinds of lithium salts of an asymmetric imide having a specific perfluoroalkyl group, or a mixed salt of a lithium salt of an asymmetric imide having a specific perfluoroalkyl group and a lithium salt of a symmetric imide having a specific perfluoroalkyl group is used, and the composition ratio of the above-mentioned one kind or two or more kinds of lithium salts and the mixed salt is set to, in a molar ratio, (lithium salt of asymmetric imide)$_x$(lithium salt of symmetric imide)$_{1-x}$ (where x is 0.1 to 1.0). By doing so, the solubility of the above-mentioned one kind or two or more kinds of lithium salts or the above-mentioned mixed salt is increased, and even if the amount of water is less than 2 moles per 1 mole of the lithium salt, the above-mentioned one kind or two or more kinds of lithium salts or the lithium salt of the mixed salt becomes an aqueous solution. Thus, the lithium salt having a concentration higher than that shown in the examples of Patent Document 5 is used, so that the binding force of the water molecule by the imide salt is further strengthened, and it has an equivalent potential window of 3.2 V as shown in the examples of Patent Document 5, and by suppressing the electrolysis of water, the coulombic efficiency can be made higher than the coulombic efficiency of the lithium battery suggested by the examples shown in Patent Document 5.

In the aqueous electrolyte solution for an energy storage device according to the second aspect of the present invention, as the electrolyte of the aqueous electrolyte solution, one kind or two or more kinds of sodium salts of an asymmetric imide having a specific perfluoroalkyl group, a mixed salt of the above-mentioned sodium salt of an asymmetric imide and a sodium salt of a symmetric imide having a specific perfluoroalkyl group, or a mixed salt of the above-mentioned sodium salt of an asymmetric imide, the above-mentioned sodium salt of a symmetric imide and a sodium salt of sulfonic acid having a perfluoroalkyl group is used, and the composition ratio of the above-mentioned one kind or two or more kinds of sodium salts and the mixed salt is set to, in a molar ratio, (sodium salt of asymmetric imide)$_x$(sodium salt of symmetric imide)$_y$(sodium salt of sulfonic acid)$_{1-(x+y)}$ (where x is 0.1 to 1.0, y is 0 to 0.9, and x+y≤1.0). By doing so, the solubility of the above-mentioned one kind or two or more kinds of sodium salts or the above-mentioned mixed salt is increased, and even if it is a low water ratio, the above-mentioned one kind or two or more kinds of sodium salts or the sodium salt of the mixed salt becomes an aqueous solution, and by suppressing the electrolysis of water, the coulombic efficiency can be made higher than the coulombic efficiency of the sodium battery suggested by the examples shown in Patent Document 5.

In the aqueous electrolyte solution for an energy storage device according to the third aspect of the present invention, as the electrolyte of the aqueous electrolyte solution, one kind or two or more kinds of potassium salts of asymmetric imide having a specific perfluoroalkyl group, a mixed salt of the above-mentioned potassium salt of an asymmetric imide and a potassium salt of a symmetric imide having a specific perfluoroalkyl group or a mixed salt of the above-mentioned potassium salt of an asymmetric imide, the above-mentioned potassium salt of a symmetric imide and a sulfonic acid potassium salt having a perfluoroalkyl group is used, and the composition ratio of the above-mentioned one kind or two or more kinds of potassium salts and the mixed salt is set to, in a molar ratio, (potassium salt of asymmetric imide)$_x$(potassium salt of symmetric imide)$_y$(sulfonic acid potassium salt)$_{1-(x+y)}$ (where x is 0.1 to 1.0, y is 0 to 0.9, and x+y≤1.0). By doing so, the solubility of the above-mentioned one kind or two or more kinds of potassium salts or the above-mentioned mixed salt is increased, and even if in the potassium having a relatively large ion radius, the above-mentioned one kind or two or more kinds of potassium salts or the potassium salt of the mixed salt become an aqueous solution in a range of an amount of the solvent of 2 moles or more and less than 40 moles per 1 mole of the potassium salt, and by suppressing the electrolysis of water, the coulombic efficiency can be made higher than the coulombic efficiency of the potassium battery suggested by the examples shown in Patent Document 5.

In the aqueous electrolyte solution for an energy storage device according to the fourth aspect of the present invention, the melting point of the above-mentioned one kind or two or more kinds of lithium salts having the asymmetric imide structure is as low as 230° C. or lower. This is because, in a lithium salt having an asymmetric imide structure, lowering in crystallinity occurs due to its unsymmetrical molecular structure, whereby the melting point is lowered than a lithium salt having a symmetric imide structure, and its solubility in water becomes high. In particular, a lithium salt having an asymmetric imide having a melting point of 230° C. or lower has high solubility in water and is useful as an aqueous electrolyte solution.

In the aqueous electrolyte solution for an energy storage device according to the fifth aspect of the present invention, the melting point of the above-mentioned one kind or two or more kinds of sodium salts having the asymmetric imide structure is as low as 240° C. or lower. This is because, in a sodium salt having an asymmetric imide structure, lowering in crystallinity occurs due to its asymmetric molecular structure, whereby the melting point is lowered than a sodium salt having a symmetric imide structure, and its solubility in water becomes high. In particular, a sodium salt having an asymmetric imide and having a melting point of 240° C. or lower has high solubility in water and is useful as an aqueous electrolyte solution.

In the aqueous electrolyte solution for an energy storage device according to the sixth aspect of the present invention, the melting point of the above-mentioned one kind or two or more kinds of potassium salts having the asymmetric imide structure is as low as 230° C. or lower. This is because, in a potassium salt having an asymmetric imide structure, lowering in crystallinity occurs due to its asymmetric molecular structure, whereby the melting point is lowered than a potassium salt having a symmetric imide structure, and its solubility in water becomes high. In particular, a potassium salt having an asymmetric imide and having a melting point of 230° C. or lower has high solubility in water and is useful as an aqueous electrolyte solution.

In the aqueous electrolyte solution for an energy storage device according to the seventh aspect of the present invention, when the fluorine ion content in the aqueous electrolyte solution is 10 ppm or less and the hydrogen content in the above-mentioned aqueous electrolyte solution is 10 ppm or less, formation of a good molten salt state is possible, and side reactions derived from impurities such as fluorine ions and hydrogen are reduced, so that the Coulomb efficiency can be further improved when a lithium battery is prepared.

In the aqueous electrolyte solution for an energy storage device according to the eighth aspect of the present invention, when the fluorine ion content in the aqueous electrolyte solution is 10 ppm or less and the hydrogen content in the above-mentioned aqueous electrolyte solution is 10 ppm or less, formation of a good molten salt state is possible, and side reactions derived from impurities such as fluorine ions and hydrogen are reduced, so that the Coulomb efficiency can be further improved when a sodium battery is prepared.

In the aqueous electrolyte solution for an energy storage device according to the ninth aspect of the present invention, when the fluorine ion content in the aqueous electrolyte solution is 10 ppm or less and the hydrogen content in the above-mentioned aqueous electrolyte solution is 10 ppm or less, formation of a good molten salt state is possible, and side reactions derived from impurities such as fluorine ions and hydrogen are reduced, so that the Coulomb efficiency can be further improved when a potassium battery is prepared.

In the aqueous electrolyte solution for an energy storage device according to the tenth aspect of the present invention, it can be suitably used for a lithium ion secondary battery, an electric double layer capacitor or a lithium ion capacitor.

In the aqueous electrolyte for an energy storage device according to the eleventh aspect of the present invention, it can be suitably used for a sodium ion secondary battery, an electric double layer capacitor or a sodium ion capacitor.

In the aqueous electrolyte solution for an energy storage device according to the twelfth aspect of the present invention, it can be suitably used for a potassium ion secondary battery, an electric double layer capacitor or a potassium ion capacitor.

One kind or two or more kinds of lithium salts of a specific asymmetric imide of the thirteenth aspect of the present invention or a mixed salt of a lithium salt of a specific asymmetric imide and a lithium salt of a specific symmetric imide of the sixteenth aspect of the present invention has few impurities such as fluorine ions and hydrogen, so that it can be suitably used as an electrolyte of an aqueous electrolyte solution for an energy storage device.

One kind or two or more kinds of sodium salts of a specific asymmetric imide of the fourteenth aspect of the present invention or a mixed salt of a sodium salt of a specific asymmetric imide and a sodium salt of a specific symmetric imide of the seventeenth aspect of the present invention or a mixed salt of a sodium salt of a specific asymmetric imide, a sodium salt of a specific symmetric imide and a sodium salt of sulfonic acid having a perfluoroalkyl group of the nineteenth aspect has few impurities such as fluorine ions and hydrogen, so that it can be suitably used as an electrolyte of an aqueous electrolyte solution for an energy storage device.

One kind or two or more kinds of potassium salts of a specific asymmetric imide of the fifteenth aspect of the present invention or a mixed salt of a potassium salt of a specific asymmetric imide and a potassium salt of a specific symmetric imide of the eighteenth aspect of the present invention or a mixed salt of a potassium salt of a specific asymmetric imide, a potassium salt of a specific symmetric imide and a sulfonic acid potassium salt having a perfluoroalkyl group of the twentieth aspect has few impurities such as fluorine ions and hydrogen, so that it can be suitably used as an electrolyte of an aqueous electrolyte solution for an energy storage device.

In the energy storage device according to the twenty-first aspect of the present invention, since it contains the aqueous electrolyte solution according to any one aspect of the first to sixth aspects, the Coulomb efficiency can be improved.

BRIEF DESCRIPTION OF DRAWINGS

FIG. 1 is a drawing showing each composition ratio of lithium salts of Examples 1-1 to 1-5, which are mixed salts of Compound 1 and Compound 3, Example 1-6, which is a lithium salt of Compound 1, and a lithium salt of Comparative example 1, which is a lithium salt of Compound 3, and a ratio of the number of moles of water to the number of moles of the lithium salt necessary for dissolution.

FIG. 2 is a drawing showing each composition ratio of lithium salts of Examples 2-1 to 2-6, which are mixed salts of Compound 2 and Compound 3, Example 2-7, which is a lithium salt of Compound 2, and Comparative example 1, which is a lithium salt of Compound 3, and a ratio of the number of moles of water to the number of moles of the lithium salt necessary for dissolution.

FIG. 3 is a drawing in which the linear sweep voltammogram measurement is carried out using a tripolar electrochemical cell with respect to the electrolyte solution of Example 1-3 and confirmed the potential window.

FIG. 4 is a drawing showing each composition ratio of sodium salts of Examples 11-2 to 11-7, which are mixed salts of Compound 11 and Compound 13, Example 11-1, which is a sodium salt of Compound 11, and a sodium salt of Comparative example 11, which is a sodium salt of Compound 13, and a ratio of the number of moles of water to the number of moles of the sodium salt necessary for dissolution.

FIG. 5 is a drawing showing each composition ratio of sodium salts of Examples 13-2 to 13-8, which are mixed salts of Compound 12 and Compound 13, Example 13-1, which is a sodium salt of Compound 12, and a sodium salt of Comparative example 11, which is a sodium salt of Compound 13, and a ratio of the number of moles of water to the number of moles of the sodium salt necessary for dissolution.

FIG. 6 is a drawing showing each composition ratio of sodium salts of Examples 14-2 to 14-6, which are mixed salts of Compound 12 and Compound 15, and Example 14-1, which is a sodium salt of Compound 12, and a ratio of the number of moles of water to the number of moles of the sodium salt necessary for dissolution.

FIG. 7 is a drawing a drawing in which the linear sweep voltammogram measurement is carried out using a tripolar electrochemical cell with respect to the electrolyte solution of Example 11-3 and confirmed the potential window.

FIG. 8 is a drawing showing each composition ratio of potassium salts of Examples 21-2 to 21-5, which are mixed salts of Compound 21 and Compound 23, Example 21-1, which is a potassium salt of Compound 21, and a potassium salt of Comparative example 21, which is a potassium salt of Compound 23, and a ratio of the number of moles of water to the number of moles of the potassium salt necessary for dissolution.

FIG. 9 is a drawing showing each composition ratio of potassium salts of Examples 23-2 to 23-5, which are mixed salts of Compound 22 and Compound 23, Example 23-1, which is a potassium salt of Compound 22, and a potassium salt of Comparative example 21, which is a potassium salt of Compound 23, and a ratio of the number of moles of water to the number of moles of the potassium salt necessary for dissolution.

FIG. 10 is a drawing in which the linear sweep voltammogram measurement is carried out using a tripolar electrochemical cell with respect to the electrolyte solution of Example 22 and confirmed the potential window.

BEST MODE(S) FOR CARRYING OUT THE INVENTION

Next, a mode for carrying out the present invention will be described with reference to the drawings.

First Embodiment

[Electrolyte Solution]
(1) Solvent

The electrolyte solution for an energy storage device of the present embodiment (hereinafter, it is sometimes simply referred to as "electrolyte solution") is characterized by being an aqueous electrolyte solution. Therefore, the solvent used in the aqueous electrolyte solution for the energy storage device of the present embodiment is water. However, the solvent can be a mixed solvent containing water and other non-aqueous solvents. Such non-aqueous solvents are soluble in water and may be mentioned, for example, alcohols such as methanol, as well as acetone, acetonitrile, dimethyl sulfoxide, or aprotic polar solvents including carbonates such as dimethyl carbonate, ethyl methyl carbonate, diethyl carbonate, ethylene carbonate, propylene carbonate, etc. Even in the case of such a mixed solvent, the ratio of water is preferably 90% or more in a volume ratio.

(2) Lithium Salt as Electrolyte

The lithium salt used as an electrolyte in the aqueous electrolyte solution for an energy storage device of the present embodiment is one kind or two or more kinds of lithium salts of an asymmetric imide having a perfluoroalkyl group, or a mixed salt of the above-mentioned lithium salt of an asymmetric imide having a perfluoroalkyl group and a lithium salt of a symmetric imide having a perfluoroalkyl group. When the composition ratio of the above-mentioned one kind or two or more kinds of lithium salts and mixed salts is expressed in molar ratio, it is (lithium salt of asymmetric imide)$_x$(lithium salt of symmetric imide)$_{1-x}$ (where x is 0.1 to 1.0.). That is, the composition ratio of the above-mentioned one kind or two or more kinds of lithium salts and the above-mentioned mixed salt is, when the total number of moles of the lithium salt of the symmetric imide and the lithium salt of the asymmetric imide is 1 mole, the lithium salt of the asymmetric imide is 0.1 mole to 1.0 mole. The composition is preferably, in terms of a molar ratio, lithium salt of asymmetric imide:lithium salt of symmetric imide=0.2:0.8 to 0.8:0.2, and more preferably 0.3:0.7 to 0.7:0.3. If the lithium salt of the asymmetric imide is less than the lower limit value of the above-mentioned molar ratio, it does not become an aqueous solution, so that the amount of the solvent is required to be 2 moles or more per 1 mole of the lithium salt.

The above-mentioned asymmetric imide lithium salt is either lithium (pentafluoroethanesulfonyl)-(trifluoromethanesulfonyl)imide $((C_2F_5SO_2)(CF_3SO_2)NLi)$ which is Compound 1 or lithium (heptafluoropropane-sulfonyl) (trifluoromethanesulfonyl)imide (($C_3F_7SO_2$)—($CF_3SO_2$)NLi) which is Compound 2. Also, the above-mentioned symmetric imide anion is lithium bis(tri-fluoromethanesulfonyl) imide (($CF_3SO_2$)$_2$NLi) which is Compound 3.

In the asymmetric imide lithium salts and symmetric imide lithium salts other than the above-mentioned Compounds 1 to 3, there are lithium salts shown in Table 1 below. In Table 1, including the lithium salts of Compounds 1 to 3, these lithium salts are shown with their respective melting points and their respective names (Compounds 1 to 7). The melting point of the lithium salt is a value measured by TG-DTA (TG-DTA2000SA manufactured by NETZSCH Japan). As is clear from Table 1, only Compounds 1 and 2 have a melting point of 230° C. or lower, and the melting points of the other lithium salts exceed 230° C.

TABLE 1

| Kind | Structural formula | Melting point (° C.) | Name |
|---|---|---|---|
| Asymmetric imide | ($C_2F_5SO_2$)($CF_3SO_2$)NLi | 228 | Compound 1 |
| Asymmetric imide | ($C_3F_7SO_2$)($CF_3SO_2$)NLi | 227 | Compound 2 |
| Symmetric imide | ($CF_3SO_2$)$_2$NLi | 234 | Compound 3 |
| Asymmetric imide | ($C_4F_9SO_2$)($CF_3SO_2$)NLi | 239 | Compound 4 |
| Symmetric imide | ($C_2F_5SO_2$)$_2$NLi | 326 | Compound 5 |
| Symmetric imide | ($C_3F_7SO_2$)$_2$NLi | 350 | Compound 6 |
| Symmetric imide | ($C_4F_9SO_2$)$_2$NLi | 350 | Compound 7 |

Also, the aqueous electrolyte solution for an energy storage device of the present embodiment is characterized by containing a high concentration of a lithium salt(s). As a result, it is possible to realize an energy storage device such as a secondary battery that generates a high voltage even in an electrode configuration that could not reversibly operate with an aqueous electrolyte solution in the past. The mixing ratio of the lithium salt and the solvent in the above-mentioned electrolyte solution is 1.0 mole or more and less than 2 moles of the solvent per 1 mole of the above-mentioned one kind or two or more kinds of the lithium salts or the lithium salts of the mixed salt, preferably 1.0 mole or more and 1.7 moles or less of the solvent. The electrolyte solution for an energy storage device of the present embodiment has a potential window that exceeds the potential window (stable potential region) of pure water by using such a high concentration lithium salt(s), and preferably has a potential window of 2.0 V or higher. Further, as another embodiment of the electrolyte solution of the present embodiment, it is also possible to understand an aqueous electrolyte solution for an energy storage device that contains water as a solvent in which the amount of water is less than 2 moles per 1 mole of the lithium salt.

Also, it is preferable that the lithium salt of the mixed salt in the aqueous electrolyte solution for an energy storage device of the present embodiment has a low melting point. In a lithium salt having an asymmetric imide structure, lowering in crystallinity occurs due to its asymmetric molecular structure, whereby the melting point is lowered than a lithium salt having a symmetric imide structure, and its solubility in water becomes high. In particular, a lithium salt having an asymmetric imide having a melting point of 230° C. or lower has high solubility in water and is useful as an aqueous electrolyte solution. Further, it is preferable that the fluorine ion content in the aqueous electrolyte solution is 10 ppm or less, and the hydrogen content in the aqueous electrolyte solution is 10 ppm or less. By doing so, formation of a good molten salt state is possible, and side reactions derived from impurities such as fluorine ions and hydrogen are reduced, so that the Coulomb efficiency of a lithium battery is further heightened. When the above-mentioned fluorine ion content exceeds 10 ppm, or when the above-mentioned hydrogen content exceeds 10 ppm, formation of a good molten salt is inhibited and side reactions derived from impurities such as fluorine ions and hydrogen increase, so that the Coulomb efficiency of a lithium battery tends to decrease.

In addition to the lithium salts described above, supporting electrolytes known in the field of the art can be included. Such a supporting electrolyte may be mentioned those selected from, for example, when the secondary battery is a lithium ion secondary battery, $LiPF_6$, $LiBF_4$, $LiClO_4$, $LiNO_3$, LiCl, $Li_2SO_4$, $Li_2S$, etc., and any combination thereof.

(3) Other Components

Also, the electrolyte solution for an energy storage device of the present embodiment may contain other components as necessary for the purpose of improving its function, etc. Examples of other components include conventionally known overcharge inhibitors, deoxidizers, and property improving aids for improving capacity retention characteristics and cycle characteristics after high temperature storage.

When the electrolyte solution contains an overcharge inhibitor, the content of the overcharge inhibitor in the electrolyte solution is preferably 0.01% by mass to 5% by mass. By containing 0.1% by mass or more of the overcharge inhibitor in the electrolyte solution, it becomes further easier to suppress the explosion and ignition of the energy storage device due to overcharge, and the energy storage device can be used more stably.

As the property improvement aid for improving the capacity retention characteristics and the cycle characteristics after high temperature storage, for example, there may be mentioned carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic acid anhydride, cyclopentanetetracarboxylic acid dianhydride, phenylsuccinic anhydride, etc.; sulfur-containing compounds such as ethylene sulfite, 1,3-propanesulton, 1,4-butanesulton, methyl methanesulfonate, busulfan, sulfolane, sulfolene, dimethyl sulfone, diphenylsulfone, methyl phenyl sulfone, dibutyl disulfide, dicyclohexyl disulfide, tetramethylthiuram monosulfide, N,N-dimethyl-methanesulfoneamide, N,N-diethylmethanesulfoneamide, etc. These property improvement aids may be used one kind alone or in combination of two or more kinds. When the electrolyte solution contains a property improvement aid, the content of the property improvement aid in the electrolyte solution is preferably 0.01% by mass to 5% by mass.

[Energy Storage Device]

The energy storage device of the present embodiment includes a positive electrode and a negative electrode, and an aqueous electrolyte solution of the present embodiment. As the energy storage device, there may be exemplified by a lithium ion secondary battery, an electric double layer capacitor, and a lithium ion capacitor.

(1) Negative Electrode

As the negative electrode in the energy storage device of the present embodiment, an electrode configuration known in the field of the art can be used. For example, when the energy storage device is a lithium ion secondary battery, an electrode containing a negative electrode active material capable of electrochemically storing and releasing lithium ions can be mentioned. As such a negative electrode active material, a known negative electrode active material for a lithium ion secondary battery can be used, and for example, carbonaceous materials such as natural graphite (graphite), highly oriented pyrolytic graphite (HOPG), amorphous carbon, etc., may be mentioned. Still other examples may be mentioned alloys containing a lithium element and metal compounds such as metal oxides, metal sulfides and metal nitrides. As the alloy having a lithium element, there may be mentioned, for example, a lithium aluminum alloy, a lithium tin alloy, a lithium lead alloy, a lithium silicon alloy, etc. Also, as the metal oxide having a lithium element, there may be mentioned, for example, lithium titanate ($Li_4Ti_5O_{12}$, etc.), etc. Further, as the metal nitride containing a lithium element, there may be mentioned, for example, lithium cobalt nitride, lithium iron nitride, lithium manganese nitride, etc. Furthermore, sulfur-based compounds can be also exemplified. Further, a metal such as iron or zinc may be used for the negative electrode. These negative electrode active materials may be used one kind alone or in combination of two or more kinds. Above all, as the negative electrode active material in the case of a lithium ion secondary battery, lithium titanate is preferable.

When the energy storage device is an electric double layer capacitor, a polarizing electrode material is contained in the negative electrode material. As the polarizing electrode material, there may be any material used for ordinary electric double layer capacitors, and may be exemplified by activated carbon produced from various raw materials. The activated carbon is preferably those having a large specific surface area.

When the energy storage device is a lithium ion capacitor, a material capable of storing and releasing lithium ions is contained in the negative electrode. As the said material, graphite-containing materials such as natural graphite and artificial graphite, etc., may be exemplified. Further, a material such as lithium titanate, etc., which exhibits a redox capacity at a constant potential by inserting and desorbing a cation such as a lithium ion, may be used. When a lithium-free material is used as the negative electrode active material, a material in which metallic lithium or a lithium-rich compound may be added to the negative electrode or the positive electrode, and lithium may be pre-doped into the negative electrode active material may be used.

When the energy storage device is a secondary battery, the above-mentioned negative electrode may contain only the negative electrode active material, or may be a material which contains at least one of a conductive material and a binding agent (binder) in addition to the negative electrode active material, and may be in a form in which the negative electrode mixture is attached to the negative electrode current collector. For example, when the negative electrode active material is in the form of a foil, it can be made a negative electrode containing only the negative electrode active material. On the other hand, when the negative electrode active material is in the form of powder, it can be made a negative electrode having a negative electrode active material and a binding agent (binder). As a method for forming the negative electrode using the powder state negative electrode active material, a molding method by a doctor blade method, a crimp press, or the like can be used. The same applies when the energy storage device is a capacitor.

As the conductive material, for example, a carbon material, a conductive fiber such as a metal fiber, a metal powder such as copper, silver, nickel, aluminum, etc., or an organic conductive material such as a polyphenylene derivative, etc., can be used. As the carbon material, graphite, soft carbon, hard carbon, carbon black, Ketjen black, acetylene black, graphite, activated carbon, carbon nanotubes, carbon fiber, etc., can be used. It is also possible to use mesoporous carbon obtained by calcining a synthetic resin containing an aromatic ring, petroleum pitch, etc.

As the binding agent, for example, a fluorine-based resin such as polyvinylidene fluoride (PVDF), polytetra-fluoroethylene (PTFE), ethylene tetrafluoroethylene (ETFE), etc., or polyethylene or polypropylene, etc., can be preferably used. As the negative electrode current collector, a rod-shaped body, a plate-shaped body, a foil-shaped body, a net-like body, etc., mainly comprising a metal such as copper, nickel, aluminum, zinc, titanium, platinum, stainless steel, etc., can be used.

(2) Positive Electrode

As the positive electrode of the energy storage device of the present embodiment, an electrode configuration known in the field of the art can be used. For example, when the energy storage device is a lithium ion secondary battery, the positive electrode active material may be mentioned a lithium-containing transition metal oxide containing one or more kinds of transition metals such as lithium cobalt oxide ($LiCoO_2$), lithium manganese oxide ($LiMn_2O_4$), lithium nickel oxide ($LiNiO_2$), $LiNi_{0.5}Mn_{1.5}O_4$, etc., transition metal sulfide, metal oxide, lithium-containing polyanionic compounds which contains one or more kinds of transition metals such as lithium iron oxide ($LiFePO_4$), lithium iron pyrophosphate ($Li_2FeP_2O_7$), etc., sulfur-based compounds ($Li_2S$), etc. The said positive electrode may contain a conductive material or a binding agent.

Also, as the positive electrode active material, oxygen or an oxygen-containing metal salt such as lithium oxide, etc., may be used. Then, the positive electrode including such a positive electrode active material may contain a catalyst that promotes the redox reaction of oxygen in such a positive electrode active material. As a preferable positive electrode active material, there may be exemplified by a transition metal oxide containing lithium excessively (the said transition metal is, for example, manganese, cobalt, iron, nickel, copper.). In addition, in order to efficiently redox oxygen in the atmosphere and create a reaction field for extracting the capacity, a high specific surface area material such as activated carbon, etc., can be used in the positive electrode.

When the energy storage device is a capacitor, the polarizing electrode material is contained in the positive electrode. As the polarizing electrode material, the material described for the negative electrode may be adopted. In addition, for the polarizing electrode materials, conductive polymers such as polyacene, etc., and a material that can be used for redox capacitors such as 2,2,6,6-tetramethylpiperidin-N-oxyl (TEMPO) whose capacitance increases due to the adsorption and desorption of anions may be used. Further, a material such as lithium manganese oxide having a spinel structure or lithium iron phosphate having an olivine structure, which exhibits a redox capacity at a constant potential of 3 V or more by inserting and desorbing a cation such as lithium ion, may be contained.

As the conductive material and the binding agent, the same material as the negative electrode can be used. As a catalyst for promoting the redox reaction of oxygen, $MnO_2$, $Fe_2O_3$, NiO, CuO, Pt, Co, etc., can be used.

As the positive electrode current collector, a rod-shaped body, a plate-shaped body, a foil-shaped body, a net-like body, etc., mainly comprising a metal such as nickel, aluminum, titanium, platinum, stainless steel, etc., can be used. When the positive electrode active material is oxygen, as the positive electrode current collector, a porous body such as a mesh (grid)-state metal, a sponge-like (foamed) metal, a punched metal, an expanded metal, etc., is used in order to enhance diffusion of oxygen. The metal is, for example, copper, nickel, aluminum, stainless steel, etc.

(3) Separator

As the separator used in the energy storage device of the present embodiment, it is not particularly limited as long as it has a function of electrically separating the positive electrode layer and the negative electrode layer, but for example, there may be mentioned porous insulating materials including porous sheets comprising a resin such as polyethylene (PE), polypropylene (PP), polyester, cellulose, polyamide, etc., and non-woven fabrics such as non-woven fabrics, glass fiber non-woven fabrics, etc.

(4) Shape, etc.

The shape of the energy storage device of the present embodiment is not particularly limited as long as it can store the positive electrode, the negative electrode, and the electrolyte solution, but for example, there may be mentioned a cylindrical type, a coin type, a flat plate type, a laminated type, etc.

Further, the case for storing the energy storage device may be an air-opening case or may be a closed-type case.

When the case of an air battery in which the positive electrode active material is oxygen is explained, the air-opening type battery case is a battery case having a ventilation port through which the atmosphere can enter and exit, and the air can come into contact with the positive electrode. On the other hand, in the case where the battery case is a closed type battery case, it is preferable that a supply pipe and a discharge pipe of a gas (air) is provided to the closed type battery case. In this case, the gas to be supplied and discharged is preferably a dry gas, above all, it is preferable that an oxygen concentration is high, and more preferably pure oxygen (99.99%). Further, it is preferable to increase the oxygen concentration during discharging and decrease the oxygen concentration during charging.

Although the electrolyte solution and the secondary battery of the present embodiment are suitable for use as a secondary battery, the use as a primary battery is not excluded.

Second Embodiment

[Electrolyte Solution]
(1) Solvent

As the electrolyte solution for the energy storage device of the present embodiment, the same solvent as that of the first embodiment can be used.

(2) Sodium Salt as Electrolyte

The sodium salt used as an electrolyte in the aqueous electrolyte solution for an energy storage device of the present embodiment is (i) one kind or two or more kinds of sodium salts of an asymmetric imide having a perfluoroalkyl group, or (ii) a mixed salt of the above-mentioned sodium salt of an asymmetric imide and a sodium salt of a symmetric imide having a perfluoroalkyl group, or (iii) a mixed salt of the above-mentioned sodium salt of an asymmetric imide, the above-mentioned sodium salt of a symmetric imide and a sodium salt of sulfonic acid having a perfluoroalkyl group. When the composition ratio of the above-mentioned one kind or two or more kinds of the sodium salt and the mixed salt is expressed in a molar ratio, it is (sodium salt of asymmetric imide)$_x$(sodium salt of symmetric imide)$_y$(sodium salt of sulfonic acid)$_{1-(x+y)}$ (where x is 0.1 to 1.0, y is 0 to 0.9, and x+y≤1.0). That is, the composition ratio of the above-mentioned one kind or two or more kinds of the sodium salts and the above-mentioned mixed salt is, when the total number of moles of the sodium salt of the symmetric imide and the sodium salt of the asymmetric imide is 1 mole, the sodium salt of the asymmetric imide is 0.1 mole to 1.0 mole. The composition is preferably in terms of a molar ratio, sodium salt of asymmetric imide:sodium salt of symmetric imide=0.3:0.7 to 1.0:0, and more preferably 0.5:0.5 to 1.0:0. If the sodium salt of the asymmetric imide is less than the lower limit of the above-mentioned molar ratio, it does not become an aqueous solution, so that the amount of solvent is required to be 6 moles or more per 1 mole of the sodium salt.

The above-mentioned asymmetric imide sodium salt is either sodium (pentafluoroethanesulfonyl)(trifluoromethanesulfonyl)imide (($C_2F_5SO_2$)($CF_3SO_2$)NNa) which is Compound 11 or sodium (heptafluoropropanesulfonyl)-(trifluoromethanesulfonyl)imide (($C_3F_7SO_2$)($CF_3SO_2$) NNa) which is Compound 12 or sodium (nonafluorobutanesulfonyl)(trifluoromethanesulfonyl)imide (($C_4F_9SO_2$)—($CF_3SO_2$) NNa) which is Compound 14. Also, the above-mentioned symmetric imide sodium salts is either sodium bis(trifluoromethanesulfonyl)imide (($CF_3SO_2$)$_2$NNa)) which is Compound 13 or sodium bis(pentafluoroethanesulfonyl)imide (($C_2F_5SO_2$)$_2$NNa) which is Compound 15.

In the asymmetric imide sodium salts and symmetric imide sodium salts other than the above-mentioned Compounds 11 to 15, there are sodium salts shown in Table 2 below. In Table 2, the sodium salts of Compounds 11 to 15, the sodium salts of Compounds 16 to 17, and the sodium salt of sulfonic acid of the above-mentioned Compound 18 are shown together with their respective melting points and their respective names (Compound 11 to Compound 18). The melting point of the sodium salt is a measured value by TG-DTA (TG-DTA2000SA manufactured by NETZSCH Japan). As is clear from Table 2, the melting points of the asymmetric imide sodium salts of Compounds 11, 12 and 14 are 240° C. or lower, and the melting points of the other sodium salts exceed 240° C.

TABLE 2

| Kind | Structural formula | Melting point (° C.) | Name |
|---|---|---|---|
| Asymmetric imide | ($C_2F_5SO_2$)($CF_3SO_2$)NNa | 191 | Compound 11 |
| Asymmetric imide | ($C_3F_7SO_2$)($CF_3SO_2$)NNa | 207 | Compound 12 |
| Symmetric imide | ($CF_3SO_2$)$_2$NNa | 258 | Compound 13 |
| Asymmetric imide | ($C_4F_9SO_2$)($CF_3SO_2$)NNa | 238 | Compound 14 |
| Symmetric imide | ($C_2F_5SO_2$)$_2$NNa | 266 | Compound 15 |
| Symmetric imide | ($C_3F_7SO_2$)$_2$NNa | 324 | Compound 16 |
| Symmetric imide | ($C_4F_9SO_2$)$_2$NNa | 343 | Compound 17 |
| Sulfonic acid | $CF_3SO_3Na$ | 254 | Compound 18 |

Also, the aqueous electrolyte solution for an energy storage device of the present embodiment is characterized by containing a high concentration of a sodium salt(s). As a result, it is possible to realize an energy storage device such as a secondary battery that generates a high voltage even in an electrode configuration that could not reversibly operate with an aqueous electrolyte solution in the past. The mixing ratio of the sodium salt and the solvent in the above-mentioned electrolyte solution is 2 moles or more and less than 6 moles of the solvent per 1 mole of the above-mentioned one kind or two or more kinds of the sodium salts or the sodium salts of the mixed salt, preferably 2.8 moles or more and 5.2 moles or less of the solvent. The electrolyte solution for an energy storage device of the present embodiment has a potential window that exceeds the potential window (stable potential region) of pure water by using such a high concentration sodium salt(s), and preferably has a potential window of 2.0 V or higher.

Also, it is preferable that the sodium salt of the mixed salt in the aqueous electrolyte solution for an energy storage device of the present embodiment has a low melting point. In a sodium salt having an asymmetric imide structure, lowering in crystallinity occurs due to its asymmetric molecular structure, whereby the melting point is lowered than a sodium salt having a symmetric imide structure, and its solubility in water becomes high. In particular, a sodium salt having an asymmetric imide having a melting point of 240° C. or lower has high solubility in water and is useful as an aqueous electrolyte solution. Further, it is preferable that the fluorine ion content in the aqueous electrolyte solution is 10 ppm or less, and the hydrogen content in the aqueous electrolyte solution is 10 ppm or less. By doing so, formation of a good molten salt state is possible, and side reactions derived from impurities such as fluorine ions and hydrogen are reduced, so that the Coulomb efficiency of a sodium battery is further heightened. When the above-mentioned fluorine ion content exceeds 10 ppm, or when the above-mentioned hydrogen content exceeds 10 ppm, formation of a good molten salt is inhibited and side reactions derived from impurities such as fluorine ions and hydrogen increase, so that the Coulomb efficiency of a sodium battery tends to decrease.

In addition to the sodium salts described above, supporting electrolytes known in the field of the art can be included. Such a supporting electrolyte may be mentioned those selected from, for example, when the secondary battery is a sodium ion secondary battery, $NaPF_6$, $NaBF_4$, $NaClO_4$, $NaNO_3$, $NaCl$, $Na_2SO_4$, $Na_2S$, etc., and any combination thereof.

(3) Other Components

Also, the electrolyte solution for an energy storage device of the present embodiment may contain other components as necessary for the purpose of improving its function, etc. As the other component, the same material as in the first embodiment can be used.

[Energy Storage Device]

The energy storage device of the present embodiment includes a positive electrode and a negative electrode, and an aqueous electrolyte solution of the present embodiment. As the energy storage device, there may be exemplified by a sodium ion secondary battery, an electric double layer capacitor, and a sodium ion capacitor.

(1) Negative Electrode

As the negative electrode in the energy storage device of the present embodiment, an electrode configuration known in the field of the art can be used. For example, when the energy storage device is a sodium ion secondary battery, an electrode containing a negative electrode active material capable of electrochemically storing and releasing sodium ions can be mentioned. As such a negative electrode active material, a known negative electrode active material for a sodium ion secondary battery can be used, and for example, carbonaceous materials such as easily graphitizable carbon and hardly graphitizable carbon (hard carbon), etc., may be mentioned. Still other examples may be mentioned metal compounds such as alloys and metal oxides containing sodium elements. As the alloys containing a sodium element, there may be mentioned, for example, sodium aluminum alloys, sodium tin alloys, sodium lead alloys, sodium silicon alloys, etc. Also, as the metal compound containing a sodium element, there may be mentioned, for example, sodium-containing titanium oxides such as sodium titanate ($Na_2Ti_3O_7$ or $Na_4Ti_5O_{12}$), etc., and sodium titanate phosphate ($NaTi_2(PO_4)_3$), etc. These negative electrode active materials may be used one kind alone or in combination of two or more kinds. Above all, as the negative electrode active material in the case of a sodium ion secondary battery, sodium titanate phosphate is preferable.

When the energy storage device is an electric double layer capacitor, a polarizing electrode material is contained in the negative electrode material. As the polarizing electrode material, the same material as in the first embodiment can be used.

When the energy storage device is a sodium ion capacitor, a material capable of storing and releasing sodium ions is contained in the negative electrode. As the said material, graphite-containing materials such as natural graphite and artificial graphite, etc., may be exemplified. Further, a material such as sodium titanate, etc., which exhibits a redox capacity at a constant potential by inserting and desorbing a cation such as a sodium ion, may be used. When a sodium-free material is used as the negative electrode active material, a material in which metallic sodium or a sodium-rich compound may be added to the negative electrode or the positive electrode, and sodium may be pre-doped into the negative electrode active material may be used.

When the energy storage device is a secondary battery, as the above-mentioned negative electrode, the same materials as in the first embodiment can be used.

(2) Positive Electrode

As the positive electrode of the energy storage device of the present embodiment, an electrode configuration known in the field of the art can be used. For example, when the energy storage device is a sodium ion secondary battery, as the positive electrode active material, there may be mentioned sodium-containing transition metal oxides containing one or more kinds of transition metals such as sodium cobalt oxide ($NaCoO_2$), sodium manganese oxide ($NaMnO_2$), sodium nickel oxide ($NaNiO_2$), sodium vanadium oxide ($NaVO_2$), sodium iron oxide ($NaFeO_2$), etc., transition metal sulfides, metal oxides, sodium-containing phosphoric acid compounds containing one or more kinds of transition metals such as sodium iron phosphate ($NaFePO_4$), or sodium vanadium phosphate ($Na_2VP_2O_7$), fluorinated sodium vanadium phosphate ($NaV_2(PO_4)_2F_3$), fluorinated sodium iron phosphate ($Na_2FePO_4F$), etc. The said positive electrode may contain a conductive material or a binding agent.

Also, as the positive electrode active material, oxygen or an oxygen-containing metal salt such as sodium oxide, etc., may be used. Then, the positive electrode including such a positive electrode active material may contain a catalyst that promotes the redox reaction of oxygen in such a positive electrode active material. As a preferable positive electrode active material, there may be exemplified by a transition metal oxide containing sodium excessively (the said transition metal is, for example, manganese, cobalt, iron, nickel, copper.). In addition, in order to efficiently redox oxygen in the atmosphere and create a reaction field for extracting the capacity, a high specific surface area material such as activated carbon, etc., can be used in the positive electrode.

When the energy storage device is a capacitor, the polarizing electrode material is contained in the positive electrode. As the polarizing electrode material, the material described for the negative electrode may be adopted. In addition, for the polarizing electrode materials, conductive polymers such as polyacene, etc., and a material that can be used for redox capacitors such as 2,2,6,6-tetramethylpiperidin-N-oxyl (TEMPO) whose capacitance increases due to the adsorption and desorption of anions may be used. Further, a material such as sodium manganese oxide having a spinel structure or sodium iron phosphate having an olivine structure, which exhibits a redox capacity at a constant potential of 3 V or more by inserting and desorbing a cation such as sodium ion, may be contained.

As the conductive material and the binding agent, and the positive electrode current collector, the same materials as those in the first embodiment can be used.

(3) Separator

As the separator used in the energy storage device of the present embodiment, the same material as that of the first embodiment can be used.

(4) Shape, etc.

As the shape of the energy storage device and the case for storing the energy storage device of the present embodiment, the same as those of the first embodiment can be used.

Incidentally, the electrolyte solution and the secondary battery of the present embodiment are suitable for use as a secondary battery as in the first embodiment, but the use as a primary battery is not excluded.

Third Embodiment

[Electrolyte Solution]

(1) Solvent

As the electrolyte solution for the energy storage device of the present embodiment, the same material as the solvent of the first embodiment can be used.

(2) Potassium Salt as an Electrolyte

The potassium salt used as an electrolyte in the aqueous electrolyte solution for an energy storage device of the present embodiment is (i) one kind or two or more kinds of potassium salts of an asymmetric imide having a perfluoroalkyl group, or (ii) a mixed salt of the above-mentioned potassium salt of an asymmetric imide and a potassium salt of a symmetric imide having a perfluoroalkyl group, or (iii) a mixed salt of the above-mentioned potassium salt of an asymmetric imide, the above-mentioned potassium salt of a symmetric imide and a sulfonic acid potassium salt having a perfluoroalkyl group. When the composition ratio of the above-mentioned one kind or two or more kinds of the potassium salt and the mixed salt is expressed in a molar ratio, it is (potassium salt of asymmetric imide)$_x$(potassium salt of symmetric imide)$_y$(sulfonic acid potassium salt)$_{1-(x+y)}$ (where x is 0.1 to 1.0, y is 0 to 0.9, and x+y≤1.0). That is, the composition ratio of the above-mentioned one kind or two or more kinds of the potassium salts and the above-mentioned mixed salt is, when the total number of moles of the potassium salt of the symmetric imide and the potassium salt of the asymmetric imide is 1 mole, the potassium salt of the asymmetric imide is 0.1 mole to 1.0 mole. The composition is preferably in terms of a molar ratio, potassium salt of asymmetric imide:potassium salt of symmetric imide=0.2:0.8 to 1.0:0, and more preferably 0.4:0.6 to 0.8:0.2. If the potassium salt of the asymmetric imide is less than the lower limit of the above-mentioned molar ratio, it does not become an aqueous solution, so that the amount of solvent is required to be 40 moles or more per 1 mole of the potassium salt.

The above-mentioned asymmetric imide potassium salt is either potassium (pentafluoroethanesulfonyl)-(trifluoromethanesulfonyl)imide (($C_2F_5SO_2$)($CF_3SO_2$)NK) which is Compound 21 or potassium (heptafluoropropane-sulfonyl) (trifluoromethanesulfonyl)imide (($C_3F_7SO_2$)—($CF_3SO_2$)NK) which is Compound 22, or potassium (nonafluorobutanesulfonyl) (trifluoromethanesulfonyl)imide (($C_4F_9SO_2$)($CF_3SO_2$)NK) which is Compound 24. Also, the above-mentioned symmetric imide anion is either potassium bis(trifluoromethanesulfonyl)imide (($CF_3SO_2$)$_2$NK) which is Compound 23 or potassium bis(pentafluoroethanesulfonyl)imide (($C_2F_5SO_2$)$_2$NK) which is Compound 25.

In the asymmetric imide potassium salts and symmetric imide potassium salts other than the above-mentioned Compounds 21 to 25, there are potassium salts shown in Table 3 below. In Table 3, the potassium salts of Compounds 21 to 25, the potassium salts of Compounds 26 to 27, and the sulfonic acid potassium salt of the above-mentioned Compound 28 are shown together with their respective melting points and their respective names (Compound 21 to Compound 28). The melting point of the potassium salt is a measured value by TG-DTA (TG-DTA2000SA manufactured by NETZSCH Japan). As is clear from Table 3, the melting points of the potassium salts of Compounds 21 to 24 are 230° C. or lower, and the melting points of the other imide potassium salts of Compounds 25 to 27 exceed 230° C.

TABLE 3

| Kind | Structural formula | Melting point (° C.) | Name |
|---|---|---|---|
| Asymmetric imide | ($C_2F_5SO_2$)($CF_3SO_2$)NK | 198 | Compound 21 |
| Asymmetric imide | ($C_3F_7SO_2$)($CF_3SO_2$)NK | 207 | Compound 22 |
| Symmetric imide | ($CF_3SO_2$)$_2$NK | 200 | Compound 23 |
| Asymmetric imide | ($C_4F_9SO_2$)($CF_3SO_2$)NK | 226 | Compound 24 |
| Symmetric imide | ($C_2F_5SO_2$)$_2$NK | 273 | Compound 25 |
| Symmetric imide | ($C_3F_7SO_2$)$_2$NK | 323 | Compound 26 |
| Symmetric imide | ($C_4F_9SO_2$)$_2$NK | 340 | Compound 27 |
| Sulfonic acid | $CF_3SO_3K$ | 236 | Compound 28 |

Also, the aqueous electrolyte solution for an energy storage device of the present embodiment is characterized by containing a high concentration of a potassium salt(s). As a result, it is possible to realize an energy storage device such as a secondary battery that generates a high voltage even in an electrode configuration that could not reversibly operate with an aqueous electrolyte solution in the past. The mixing ratio of the potassium salt and the solvent in the above-mentioned electrolyte solution is 2 moles or more and less than 40 moles of the solvent per 1 mole of the above-mentioned one kind or two or more kinds of the potassium salts or the potassium salts of the mixed salt, preferably 4 moles or more and 34 moles or less of the solvent. The electrolyte solution for an energy storage device of the present embodiment has a potential window that exceeds the potential window (stable potential region) of pure water by using such a high concentration potassium salt(s), and preferably has a potential window of 2.0 V or higher.

Also, it is preferable that the potassium salt of the mixed salt in the aqueous electrolyte solution for an energy storage device of the present embodiment has a low melting point. In a potassium salt having an asymmetric imide structure, lowering in crystallinity occurs due to its asymmetric molecular structure, whereby the melting point is lowered than a potassium salt having a symmetric imide structure, and its solubility in water becomes high. In particular, a potassium salt having an asymmetric imide having a melting point of 230° C. or lower has high solubility in water and is useful as an aqueous electrolyte solution. Further, it is preferable that the fluorine ion content in the aqueous electrolyte solution is 10 ppm or less, and the hydrogen content in the aqueous electrolyte solution is 10 ppm or less. By doing so, formation of a good molten salt state is possible, and side reactions derived from impurities such as fluorine ions and hydrogen are reduced, so that the Coulomb efficiency of a potassium battery is further heightened. When the above-mentioned fluorine ion content exceeds 10 ppm, or when the above-mentioned hydrogen content exceeds 10 ppm, formation of a good molten salt is inhibited and side reactions derived from impurities such as fluorine ions and hydrogen increase, so that the Coulomb efficiency of a potassium battery tends to decrease.

In addition to the potassium salts described above, supporting electrolytes known in the field of the art can be included. Such a supporting electrolyte may be mentioned those selected from, for example, when the secondary battery is a potassium ion secondary battery, $KPF_6$, $KBF_4$, $KClO_4$, $KNO_3$, $KCl$, $K_2SO_4$, $K_2S$, etc., and any combination thereof.

(3) Other Components

Also, the electrolyte solution for an energy storage device of the present embodiment may contain other components as necessary for the purpose of improving its function, etc. As the other component, the same material as in the first embodiment can be used.

[Energy Storage Device]

The energy storage device of the present embodiment includes a positive electrode and a negative electrode, and an aqueous electrolyte solution of the present embodiment. As the energy storage device, there may be exemplified by a potassium ion secondary battery, an electric double layer capacitor, and a potassium ion capacitor.

(1) Negative Electrode

As the negative electrode in the energy storage device of the present embodiment, an electrode configuration known in the field of the art can be used. For example, when the energy storage device is a potassium ion secondary battery, an electrode containing a negative electrode active material capable of electrochemically storing and releasing potassium ions can be mentioned. As such a negative electrode active material, a known negative electrode active material for a potassium ion secondary battery can be used, and for example, carbonaceous materials such as easily graphitizable carbon and hardly graphitizable carbon (hard carbon), etc., may be mentioned. Still other examples may be mentioned metal compounds such as alloys and metal oxides containing potassium elements. As the alloys containing a potassium element, there may be mentioned, for example, potassium aluminum alloys, potassium tin alloys, potassium lead alloys, potassium silicon alloys, etc. Also, as the metal compound containing a potassium element, there may be mentioned, for example, potassium-containing titanium oxides such as potassium titanate ($K_2Ti_3O_7$ or $K_4Ti_5O_{12}$). These negative electrode active materials may be used one kind alone or in combination of two or more kinds. Above all, as the negative electrode active material in the case of a potassium ion secondary battery, potassium titanate is preferable.

When the energy storage device is an electric double layer capacitor, a polarizing electrode material is contained in the negative electrode material. As the polarizing electrode material, the same material as in the first embodiment can be used.

When the energy storage device is a potassium ion capacitor, a material capable of storing and releasing potassium ions is contained in the negative electrode. As the said material, graphite-containing materials such as natural graphite and artificial graphite, etc., may be exemplified. Further, a material such as potassium titanate, etc., which exhibits a redox capacity at a constant potential by inserting and desorbing a cation such as a potassium ion, may be used. When a potassium-free material is used as the negative electrode active material, a material in which metallic potassium or a potassium-rich compound may be added to the negative electrode or the positive electrode, and potassium may be pre-doped into the negative electrode active material may be used.

When the energy storage device is a secondary battery, the same negative electrode as in the first embodiment can be used as the negative electrode.

(2) Positive Electrode

As the positive electrode of the energy storage device of the present embodiment, an electrode configuration known in the field of the art can be used. For example, when the energy storage device is a potassium ion secondary battery, as the positive electrode active material, there may be mentioned potassium-containing transition metal oxides containing one or more kinds of transition metals such as potassium cobalt oxide ($KCoO_2$), potassium manganese oxide ($KMnO_2$), potassium nickel oxide ($KNiO_2$), potassium vanadium oxide ($KVO_2$), potassium iron oxide ($KFeO_2$), etc., transition metal sulfides, metal oxides, potassium-containing phosphoric acid compounds containing one or more kinds of transition metals such as potassium iron phosphate ($KFePO_4$), or potassium cobalt phosphate ($K_2CoPO_4$), fluorinated potassium cobalt phosphate ($KCoPO_4F$), fluorinated potassium iron phosphate ($K_2FePO_4F$), etc. The said positive electrode may contain a conductive material or a binding agent.

Also, as the positive electrode active material, oxygen or an oxygen-containing metal salt such as potassium oxide, etc., may be used. Then, the positive electrode including the positive electrode active material may contain a catalyst that promotes the redox reaction of oxygen in the positive electrode active material. As a preferable positive electrode active material, there may be exemplified by a transition metal oxide containing potassium excessively (the said transition metal is, for example, manganese, cobalt, iron, nickel, copper.). In addition, in order to efficiently redox oxygen in the atmosphere and create a reaction field for extracting the capacity, a high specific surface area material such as activated carbon, etc., can be used in the positive electrode.

When the energy storage device is a capacitor, the polarizing electrode material is contained in the positive electrode. As the polarizing electrode material, the material described for the negative electrode may be adopted. In addition, for the polarizing electrode materials, conductive polymers such as polyacene, etc., and a material that can be used for redox capacitors such as 2,2,6,6-tetramethylpiperidin-N-oxyl (TEMPO) whose capacitance increases due to the adsorption and desorption of anions may be used. Further, a material such as potassium manganese oxide having a spinel structure or potassium iron phosphate having an olivine structure, which exhibits a redox capacity at a constant potential of 3 V or more by inserting and desorbing a cation such as a potassium ion, may be contained.

As the conductive material and the binding agent, and the positive electrode current collector, the same materials as those in the first embodiment can be used.

(3) Separator

As the separator used in the energy storage device of the present embodiment, the same material as that of the first embodiment can be used.

(4) Shape, etc.

As the shape of the energy storage device and the case for storing the energy storage device of the present embodiment, the same as those of the first embodiment can be used.

Incidentally, the electrolyte solution and the secondary battery of the present embodiment are suitable for use as a secondary battery as in the first embodiment, but the use as a primary battery is not excluded.

EXAMPLES

Next, Examples of the present invention will be described in detail in the order of a lithium salt, a sodium salt and a potassium salt together with Comparative examples.

[A] An electrolyte solution using a lithium salt(s) will be described.

Example 1-1

1.3 moles of water were added to a mixed salt in which 0.9 mole of "Compound 1" containing 4 ppm of a fluorine ion and 3 ppm of hydrogen, respectively, as an asymmetric imide, and 0.1 mole of "Compound 3" containing 8 ppm of a fluorine ion and 1 ppm of hydrogen, respectively, as a symmetric imide had been mixed, and the mixture was heated and melted at 50° C. to prepare an electrolyte solution as a saturated aqueous solution of the lithium salts at room temperature. The fluorine ion content and hydrogen content of this electrolyte solution were 4 ppm and 3 ppm, respectively.

Example 1-2

1.1 mole of water was added to a mixed salt in which 0.7 mole of "Compound 1" which was the same as in Example 1-1 and 0.3 mole of "Compound 3" which was the same as in Example 1-1 had been mixed, and the mixture was heated and melted at 50° C. to prepare an electrolyte solution as a saturated aqueous solution of the lithium salts at room temperature. The fluorine ion content and hydrogen content of this electrolyte solution were 5 ppm and 2 ppm, respectively.

Example 1-3

1.0 mole of water was added to a mixed salt in which 0.6 mole of "Compound 1" which was the same as in Example 1-1 and 0.4 mole of "Compound 3" which was the same as in Example 1-1 had been mixed, and the mixture was heated and melted at 50° C. to prepare an electrolyte solution as a saturated aqueous solution of the lithium salts at room temperature. The fluorine ion content and hydrogen content of this electrolyte solution were 5 ppm and 2 ppm, respectively.

Example 1-4

1.2 moles of water were added to a mixed salt in which 0.5 mole of "Compound 1" which was the same as in Example 1-1 and 0.5 mole of "Compound 3" which was the same as in Example 1-1 had been mixed, and the mixture was heated and melted at 50° C. to prepare an electrolyte solution as a saturated aqueous solution of the lithium salts at room temperature. The fluorine ion content and hydrogen content of this electrolyte solution were 5 ppm and 2 ppm, respectively.

Example 1-5

1.8 moles of water were added to a mixed salt in which 0.3 mole of "Compound 1" which was the same as in Example 1-1 and 0.7 mole of "Compound 3" which was the same as in Example 1-1 had been mixed, and the mixture was heated and melted at 50° C. to prepare an electrolyte solution as a saturated aqueous solution of the lithium salts at room temperature. The fluorine ion content and hydrogen content of this electrolyte solution were 6 ppm and 1 ppm, respectively.

Example 1-6

1.3 moles of water were added to 1 mole of a single salt of "Compound 1" which was the lithium salt having the same asymmetric imide structure as in Example 1-1, and the mixture was heated and melted at 50° C. to prepare an electrolyte solution as a saturated aqueous solution of a lithium salt at room temperature. The fluorine ion content and hydrogen content of this electrolyte solution were 4 ppm and 3 ppm, respectively.

Comparative Example 1

2.6 moles of water were added to 1 mole of a single salt of "Compound 3" which was the lithium salt having the same symmetric imide structure as in Example 1-1, and the mixture was heated and melted at 50° C. to prepare an electrolyte solution as a saturated aqueous solution of a lithium salt at room temperature. The fluorine ion content and hydrogen content of this electrolyte solution were 7 ppm and 1 ppm, respectively.

In FIG. 1, each composition ratio of a lithium salt(s) of Examples 1-1 to 1-5 which are a mixed salt of Compound 1 and Compound 3, Example 1-6 which is a single salt of Compound 1, and Comparative example 1 which is a single salt of Compound 3 and each amount of water necessary for dissolution are shown. In FIG. 1, the vertical axis represents (number of moles of water)/−(number of moles of all lithium salts), and the horizontal axis represents the molar ratio of Compound 1 based on the total amount of Compound 1 and Compound 3. From FIG. 1, in the mixed salts of Examples 1-1 to 1-5 or the single salt having an asymmetric imide structure of Example 1-6, it was demonstrated that they became an aqueous solution when (number of moles of water)/(number of moles of all lithium salts) was 1.0 to 1.8. On the other hand, it was demonstrated that, in the single salt having a symmetric imide structure of Comparative example 1, it did not become an aqueous solution until (number of moles of water)/(number of moles of all lithium salts) reached 2.6.

Example 2-1

1.8 moles of water were added to a mixed salt in which 0.8 mole of "Compound 2" containing 2 ppm of a fluorine ion and 5 ppm of hydrogen, respectively, as an asymmetric imide, and 0.2 mole of "Compound 3" containing 8 ppm of a fluorine ion and 1 ppm of hydrogen, respectively, as a symmetric imide had been mixed, and the mixture was heated and melted at 50° C. to prepare an electrolyte solution as a saturated aqueous solution of the lithium salts at room temperature. The fluorine ion content and hydrogen content of this electrolyte solution were 3 ppm and 4 ppm, respectively.

Example 2-2

1.5 moles of water were added to a mixed salt in which 0.5 mole of "Compound 2" which was the same as in Example 2-1 and 0.5 mole of "Compound 3" which was the same as in Example 2-1 had been mixed, and the mixture was heated and melted at 50° C. to prepare an electrolyte solution as a saturated aqueous solution of the lithium salts at room temperature. The fluorine ion content and hydrogen content of this electrolyte solution were 4 ppm and 3 ppm, respectively.

Example 2-3

1.4 moles of water were added to a mixed salt in which 0.4 mole of "Compound 2" which was the same as in Example 2-1 and 0.6 mole of "Compound 3" which was the same as in Example 2-1 had been mixed, and the mixture was heated and melted at 50° C. to prepare an electrolyte solution as a saturated aqueous solution of the lithium salts at room temperature. The fluorine ion content and hydrogen content of this electrolyte solution were 5 ppm and 3 ppm, respectively.

Example 2-4

1.7 moles of water were added to a mixed salt in which 0.3 mole of "Compound 2" which was the same as in Example 2-1 and 0.7 mole of "Compound 3" which was the same as in Example 2-1 had been mixed, and the mixture was heated and melted at 50° C. to prepare an electrolyte solution as a saturated aqueous solution of the lithium salts at room temperature. The fluorine ion content and hydrogen content of this electrolyte solution were 5 ppm and 2 ppm, respectively.

Example 2-5

1.8 moles of water were added to a mixed salt in which 0.2 mole of "Compound 2" which was the same as in Example 2-1 and 0.8 mole of "Compound 3" which was the same as in Example 2-1 had been mixed, and the mixture was heated and melted at 50° C. to prepare an electrolyte solution as a saturated aqueous solution of the lithium salts at room temperature. The fluorine ion content and hydrogen content of this electrolyte solution were 6 ppm and 2 ppm, respectively.

Example 2-6

1.9 moles of water were added to a mixed salt in which 0.1 mole of "Compound 2" which was the same as in Example 2-1 and 0.9 mole of "Compound 3" which was the same as in Example 2-1 had been mixed, and the mixture was heated and melted at 50° C. to prepare an electrolyte solution as a saturated aqueous solution of the lithium salts at room temperature. The fluorine ion content and hydrogen content of this electrolyte solution were 6 ppm and 1 ppm, respectively.

Example 2-7

1.9 moles of water were added to 1 mole of a single salt of "Compound 2" which was the lithium salt having the same asymmetric imide structure as in Example 2-1, and the mixture was heated and melted at 50° C. to prepare an electrolyte solution as a saturated aqueous solution of the lithium salt at room temperature. The fluorine ion content and hydrogen content of this electrolyte solution were 2 ppm and 5 ppm, respectively.

In FIG. 2, each composition ratio of a lithium salt(s) of Examples 2-1 to 2-6 which are a mixed salt of Compound 2 and Compound 3, Example 2-7 which is a single salt having an asymmetric imide structure of Compound 2, and Comparative example 1 which is a single salt having a symmetric imide structure of Compound 3 as mentioned above and each amount of water necessary for dissolution are shown. The vertical axis of FIG. 2 is the same as in FIG. 1. The horizontal axis of FIG. 2 represents the molar ratio of Compound 2 based on the total amount of Compound 2 and Compound 3. From FIG. 2, in the mixed salts of Examples 2-1 to 2-6 or the single salt having an asymmetric imide structure of Example 2-7, it was demonstrated that they became an aqueous solution when (number of moles of water)/(number of moles of all lithium salts) was 1.4 to 1.9. On the other hand, it was demonstrated that, in the single salt having a symmetric imide structure of Comparative example 1, it did not become an aqueous solution until (number of moles of water)/(number of moles of all lithium salts) reached 2.6.

Example 1-7

1.9 moles of water were added to a mixed salt in which 0.3 mole of "Compound 1" containing 26 ppm of a fluorine ion and 8 ppm of hydrogen, respectively, as an asymmetric imide, and 0.7 mole of "Compound 3" containing 2 ppm of a fluorine ion and 15 ppm of hydrogen, respectively, as a symmetric imide had been mixed, and the mixture was heated and melted at 50° C. to prepare an electrolyte solution as a saturated aqueous solution of the lithium salts at room temperature. The fluorine ion content and hydrogen content of this electrolyte solution were 9 ppm and 11 ppm, respectively.

Example 1-8

1.2 moles of water were added to a mixed salt in which 0.8 mole of "Compound 1" which was the same as in Example 1-7 and 0.2 mole of "Compound 3" which was the same as in Example 1-7 had been mixed, and the mixture was heated and melted at 50° C. to prepare an electrolyte solution as a saturated aqueous solution of the lithium salts at room temperature. The fluorine ion content and hydrogen content of this electrolyte solution were 20 ppm and 9 ppm, respectively.

Example 1-9

1.3 moles of water were added to a mixed salt in which 0.5 mole of "Compound 1" which was the same as in Example 1-7 and 0.5 mole of "Compound 3" which was the same as in Example 1-7 had been mixed, and the mixture was heated and melted at 50° C. to prepare an electrolyte solution as a saturated aqueous solution of the lithium salts at room temperature. The fluorine ion content and hydrogen content of this electrolyte solution were 14 ppm and 10 ppm, respectively.

Comparative Example 2

As a symmetric imide, lithium bis(pentafluoro-ethanesulfonyl)imide (($C_2F_5SO_2$)$_2$NLi) shown as "Compound 5" in Table 1, and as a symmetric imide, "Compound 3" same as in Example 1-1 were used. 2.0 moles of water were added to a mixed salt in which 0.3 mole of "Compound 5" and 0.7 mole of "Compound 3" had been mixed, and the mixture was heated and melted at 50° C. to prepare an electrolyte solution as a saturated aqueous solution of the lithium salts at room temperature. The fluorine ion content and hydrogen content of this electrolyte solution were 7 ppm and 7 ppm, respectively.

Comparative Example 3

As an asymmetric imide, lithium (nonafluorobutanesulfonyl) (trifluoromethanesulfonyl)imide (($C_4F_9SO_2$)($CF_3SO_2$)NLi) shown as "Compound 4" in Table 1 and as a symmetric imide, "Compound 3" same as in Example 1-1 were used. 2.0 moles of water were added to a mixed salt in which 0.4 mole of "Compound 4" and 0.6 mole of "Compound 3" had been mixed, and the mixture was heated and melted at 50° C. to prepare an electrolyte solution as a saturated aqueous solution of the lithium salts at room temperature. The fluorine ion content and hydrogen content of this electrolyte solution were 5 ppm and 3 ppm, respectively.

Example 3

1.8 moles of water were added to a mixed salt in which 0.5 mole of "Compound 1" containing 4 ppm of a fluorine ion and 3 ppm of hydrogen, respectively, as an asymmetric imide, and 0.5 mole of "Compound 2" containing 2 ppm of a fluorine ion and 5 ppm of hydrogen, respectively, as an asymmetric imide had been mixed, and the mixture was heated and melted at 50° C. to prepare an electrolyte solution as a saturated aqueous solution of the lithium salts at room temperature. The fluorine ion content and hydrogen content of this electrolyte solution were 3 ppm and 4 ppm, respectively.

<Evaluation Test 1>

The fluorine ion content and hydrogen content of the electrolyte solutions of 20 kinds of the above-mentioned Example 1-1 to Example 1-9, Comparative example 1, Example 2-1 to Example 2-7, Comparative example 2, Comparative example 3 and Example 3, and the coulombic efficiency (charge/discharge efficiency) of the coin-type lithium ion secondary batteries using these electrolyte solutions were measured, respectively. Hereinafter, each measurement method will be described.

(1) Fluorine Ion Content

The fluorine ion content of each of the above-mentioned compounds and the compounds described later, and the fluorine ion content in the electrolyte solutions were measured by an ion chromatograph (ICS-2100 manufactured by Thermo Co., Ltd.).

(2) Hydrogen Content

The hydrogen content of each of the above-mentioned compounds and the compounds described later, and the hydrogen content in the electrolyte solutions were calculated from the measurement results of 1H-NMR (AV400M manufactured by Bruker Co., Ltd.).

(3) Coulombic Efficiency

The configuration of the secondary battery used for measuring the Coulomb efficiency is as follows. The positive electrode was composed of a positive electrode mixture layer containing 85% by mass of $LiCoO_2$, 9% by mass of PVDF, and 6% by mass of acetylene black, and a current collector made of titanium. The negative electrode was composed of a negative electrode mixture layer containing 85% by mass of $Li_4Ti_5O_{12}$, 5% by mass of PVDF and 10% by mass of acetylene black, and a current collector made of aluminum. As the separator, a glass fiber non-woven fabric filter was used. Charge and discharge of the secondary battery was carried for 10 cycles at a temperature of 25° C. in the range of 1.7 V to 2.8 V, and the Coulomb efficiency in the 10th cycle was defined as the Coulomb efficiency.

In the following Table 4, with regard to 20 kinds of the electrolyte solutions, the kinds and ratios of lithium salts constituting lithium salts of a mixed salt or a single salt, the molar amount of water per 1 mole of the lithium salt, the fluorine ion content, and the hydrogen content are shown, respectively. The kinds and ratios of lithium salts constituting the lithium salt of the mixed salt or the single salt are shown as Lithium salt 1 and Lithium salt 2. In addition, in the following Table 4, the Coulombic efficiency of secondary batteries using 20 kinds of the electrolyte solutions is shown.

TABLE 4

| | Lithium salt 1 | | Lithium salt 2 | | Mole amount of water per 1 mole of lithium salt | Fluorine ion content (ppm) | Hydrogen content (ppm) | Coulombic efficiency (%) |
|---|---|---|---|---|---|---|---|---|
| | Kind | Ratio | Kind | Ratio | | | | |
| Example 1-1 | Compound 1 | 0.9 | Compound 3 | 0.1 | 1.3 | 4 | 3 | 97.5 |
| Example 1-2 | Compound 1 | 0.7 | Compound 3 | 0.3 | 1.1 | 5 | 2 | 97.9 |

TABLE 4-continued

|  | Lithium salt 1 | | Lithium salt 2 | | Mole amount of water per 1 mole of lithium salt | Fluorine ion content (ppm) | Hydrogen content (ppm) | Coulombic efficiency (%) |
| --- | --- | --- | --- | --- | --- | --- | --- | --- |
|  | Kind | Ratio | Kind | Ratio |  |  |  |  |
| Example 1-3 | Compound 1 | 0.6 | Compound 3 | 0.4 | 1.0 | 5 | 2 | 98.1 |
| Example 1-4 | Compound 1 | 0.5 | Compound 3 | 0.5 | 1.2 | 5 | 2 | 97.8 |
| Example 1-5 | Compound 1 | 0.3 | Compound 3 | 0.7 | 1.8 | 6 | 1 | 97.2 |
| Example 1-6 | Compound 1 | 1 | Compound 3 | — | 1.3 | 4 | 3 | 96.3 |
| Comparative example 1 | Compound 1 | — | Compound 3 | 1 | 2.6 | 7 | 1 | 95.1 |
| Example 2-1 | Compound 2 | 0.8 | Compound 3 | 0.2 | 1.8 | 3 | 4 | 97.2 |
| Example 2-2 | Compound 2 | 0.5 | Compound 3 | 0.5 | 1.5 | 4 | 3 | 98.0 |
| Example 2-3 | Compound 2 | 0.4 | Compound 3 | 0.6 | 1.4 | 5 | 3 | 98.4 |
| Example 2-4 | Compound 2 | 0.3 | Compound 3 | 0.7 | 1.7 | 5 | 2 | 97.3 |
| Example 2-5 | Compound 2 | 0.2 | Compound 3 | 0.8 | 1.8 | 6 | 2 | 97.2 |
| Example 2-6 | Compound 2 | 0.1 | Compound 3 | 0.9 | 1.9 | 6 | 1 | 96.8 |
| Example 2-7 | Compound 2 | 1 | Compound 3 | — | 1.9 | 2 | 5 | 96.6 |
| Example 1-7 | Compound 1 | 0.3 | Compound 3 | 0.7 | 1.9 | 9 | 11 | 96.1 |
| Example 1-8 | Compound 1 | 0.8 | Compound 3 | 0.2 | 1.2 | 20 | 9 | 96.5 |
| Example 1-9 | Compound 1 | 0.5 | Compound 3 | 0.5 | 1.3 | 14 | 10 | 96.9 |
| Comparative example 2 | Compound 5 | 0.3 | Compound 3 | 0.7 | 2.0 | 7 | 7 | 95.1 |
| Comparative example 3 | Compound 4 | 0.4 | Compound 3 | 0.6 | 2.0 | 5 | 3 | 94.8 |
| Example 3 | Compound 1 | 0.5 | Compound 2 | 0.5 | 1.8 | 3 | 4 | 97.2 |

As is clear from Table 4, in Comparative example 1, the lithium salt of the asymmetric imide was not used and only the lithium salt of the symmetric imide was used (1 mole), so that the molar amount of water per 1 mole of the lithium salt was required to be 2.6 moles. The Coulomb efficiency of the secondary battery using this electrolyte solution was not so high as 95.1%.

In Comparative example 2, lithium bis(pentafluoroethanesulfonyl)imide (($C_2F_5SO_2$)$_2$NLi) of Compound 5 having a melting point exceeding 230° C. was used as the lithium salt of the symmetric imide, so that the molar amount of water per 1 mole of the lithium salt was required to be 2.0 moles. The Coulomb efficiency of the secondary battery using this electrolyte solution was not so high as 95.1%.

In Comparative example 3, lithium (nonafluoro-butanesulfonyl)(trifluoromethanesulfonyl)imide (($C_4F_9SO_2$)($CF_3SO_2$)NLi) of Compound 4 having a melting point of exceeding 230° C. was used as the lithium salt of the asymmetric imide, so that the molar amount of water per 1 mole of the lithium salt was required to be 2.0 moles. The Coulomb efficiency of the secondary battery using this electrolyte solution was not so high as 94.8%.

To the contrary, in Examples 1-1 to 1-9, Examples 2-1 to 2-7 and Example 3, the lithium salt is an asymmetric imide lithium salt having the requirements of the first aspect of the present invention (Compound 1 and/or Compound 2) or a mixed salt of an asymmetric imide lithium salt (Compound 1 or Compound 2) and a symmetric imide lithium salt (Compound 3), and the composition ratio of which has the requirements of the first aspect of the invention, so that the molar amount of water per 1 mole of the lithium salt was less than 2 moles, i.e., 1.0 mole to 1.9 moles. Therefore, the Coulomb efficiency of the secondary battery using these electrolyte solutions was as high as 96.1% to 98.4%.

(4) Confirmation of Potential Window

For the electrolyte solution of Example 1-3, the linear sweep voltammogram measurement was carried out using the following tripolar electrochemical cell, and the potential window was confirmed. The measurement temperature was 25° C. and the sweep rate was made 0.1 mV/sec.

Working electrode and counter electrode: Platinum
Reference electrode: Ag/AgCl (saturated KCl)

The above results are shown in FIG. 3. From the results of FIG. 3, the potential window of the electrolyte solution of Example 1-3 was calculated to be 2.7 V.

[B] An electrolyte solution using a sodium salt(s) will be described.

Example 11-1

3.5 moles of water were added to 1.0 mole of a single salt of "Compound 11" as an asymmetric imide containing 7 ppm of a fluorine ion and 3 ppm of hydrogen, respectively, and the mixture was heated and melted at 50° C. to prepare an electrolyte solution as a saturated aqueous solution of a sodium salt at room temperature.

Example 11-2

As the symmetric imide, sodium bis(trifluoro-methane-sulfonyl)imide (($CF_3SO_2$)$_2$NNa) shown in Table 2 as "Compound 13" was used. 3.2 moles of water were added to a mixed salt in which 0.9 mole of "Compound 11" which was the same as in Example 11-1 and 0.1 mole of "Compound 13" containing 9 ppm of a fluorine ion and 1 ppm of hydrogen had been mixed, and the mixture was heated and melted at 50° C. to prepare an electrolyte solution as a saturated aqueous solution of the sodium salts at room temperature.

Example 11-3

3.1 moles of water were added to a mixed salt in which 0.8 mole of "Compound 11" which was the same as in Example 11-1 and 0.2 mole of "Compound 13" as a symmetric imide containing 9 ppm of fluorine ion and 1 ppm of hydrogen, respectively, had been mixed, and the mixture was heated and melted at 50° C. to prepare an electrolyte solution as a saturated aqueous solution of the sodium salt at room temperature.

Example 11-4

3.9 moles of water were added to a mixed salt in which 0.7 mole of "Compound 11" which was the same as in Example 11-1 and 0.3 mole of "Compound 13" which was the same as in Example 11-2 had been mixed, and the mixture was heated and melted at 50° C. to prepare an electrolyte solution as a saturated aqueous solution of the sodium salt at room temperature.

Example 11-5

4.4 moles of water were added to a mixed salt in which 0.6 mole of "Compound 11" which was the same as in Example 11-1 and 0.4 mole of "Compound 13" which was the same as in Example 11-2 had been mixed, and the mixture was heated and melted at 50° C. to prepare an electrolyte solution as a saturated aqueous solution of the sodium salt at room temperature.

Example 11-6

4.8 moles of water were added to a mixed salt in which 0.4 mole of "Compound 11" which was the same as in Example 11-1 and 0.6 mole of "Compound 13" which was the same as in Example 11-2 had been mixed, and the mixture was heated and melted at 50° C. to prepare an electrolyte solution as a saturated aqueous solution of the sodium salt at room temperature.

Example 11-7

5.4 moles of water were added to a mixed salt in which 0.2 mole of "Compound 11" which was the same as in Example 11-1 and 0.8 mole of "Compound 13" which was the same as in Example 11-2 had been mixed, and the mixture was heated and melted at 50° C. to prepare an electrolyte solution as a saturated aqueous solution of the sodium salt at room temperature.

Comparative Example 11

6.3 moles of water were added to 1 mole of a single salt of "Compound 13" which was a sodium salt having the same symmetric imide structure as in Example 11-2, and the mixture was heated and melted at 50° C. to prepare an electrolyte solution as a saturated aqueous solution of the sodium salt at room temperature.

In FIG. 4, each composition ratio of a sodium salt(s) of Examples 11-2 to 11-7 which are a mixed salt of Compound 11 and Compound 13, Example 11-1 which is a single salt of Compound 11, and Comparative example 11 which is a single salt of Compound 13 and each amount of water necessary for dissolution are shown. In FIG. 4, the vertical axis represents (number of moles of water)/(number of moles of all sodium salts), and the horizontal axis represents the molar ratio of Compound 11 based on the total amount of Compound 11 and Compound 13. From FIG. 4, in the mixed salts of Examples 11-2 to 11-7 or the single salt having an asymmetric imide structure of Example 11-1, it was demonstrated that they became an aqueous solution when (number of moles of water)/(number of moles of all sodium salts) was 3.1 to 5.4. On the other hand, it was demonstrated that, in the single salt having a symmetric imide structure of Comparative example 11, it did not become an aqueous solution until (number of moles of water)/(number of moles of all sodium salts) reached 6.3.

Example 12

3.0 moles of water were added to a mixed salt in which 0.65 mole of "Compound 11" which was the same as in Example 11-1, 0.14 mole of "Compound 13" which was the same as in Example 11-2 and 0.21 mole of "Compound 18" as a sodium sulfonate salt containing 4 ppm of a fluorine ion and 1 ppm of hydrogen, respectively, had been mixed, and the mixture was heated and melted at 50° C. to prepare an electrolyte solution as a saturated aqueous solution of the sodium salts at room temperature.

Example 13-1

3.5 moles of water were added to 1 mole of a single salt of "Compound 12" as an asymmetric imide containing 5 ppm of a fluorine ion and 7 ppm of hydrogen, respectively, and the mixture was heated and melted at 50° C. to prepare an electrolyte solution as a saturated aqueous solution of a sodium salt at room temperature.

Example 13-2

2.8 moles of water were added to a mixed salt in which 0.8 mole of "Compound 12" which was the same as in Example 13-1 and 0.2 mole of "Compound 13" which was the same as in Example 11-2 had been mixed, and the mixture was heated and melted at 50° C. to prepare an electrolyte solution as a saturated aqueous solution of the sodium salts at room temperature.

Example 13-3

4.0 moles of water were added to a mixed salt in which 0.5 mole of "Compound 12" which was the same as in Example 13-1 and 0.5 mole of "Compound 13" which was the same as in Example 11-2 had been mixed, and the mixture was heated and melted at 50° C. to prepare an electrolyte solution as a saturated aqueous solution of the sodium salts at room temperature.

Example 13-4

4.7 moles of water were added to a mixed salt obtained by mixing 0.3 mole of "Compound 12" which was the same as in Example 13-1 and 0.7 mole of "Compound 13" which was the same as in Example 11-2 had been mixed, and the mixture was heated and melted at 50° C. to prepare an electrolyte solution as a saturated aqueous solution of the sodium salts at room temperature.

Example 13-5

5.8 moles of water were added to a mixed salt in which 0.1 mole of "Compound 12" which was the same as Example 13-1 and 0.9 mole of "Compound 13" which was the same as Example 11-2 had been mixed, and the mixture was heated and melted at 50° C. to prepare an electrolyte solution as a saturated aqueous solution of the sodium salts at room temperature.

Example 13-6

5.2 moles of water were added to a mixed salt in which 0.2 mole of "Compound 12" as an asymmetric imide containing 32 ppm of a fluorine ion and 8 ppm of hydrogen, respectively, and 0.8 mole of "Compound 13" as a symmetric imide containing 2 ppm of a fluorine ion and 15 ppm of hydrogen, respectively, had been mixed, and the mixture was heated and melted at 50° C. to prepare an electrolyte solution as a saturated aqueous solution of the sodium salts at room temperature.

Example 13-7

3.2 moles of water were added to a mixed salt in which 0.7 mole of "Compound 12" which was the same as in Example 13-6 and 0.3 mole of "Compound 13" which was the same as in Example 13-6 had been mixed, and the mixture was heated and melted at 50° C. to prepare an electrolyte solution as a saturated aqueous solution of the sodium salts at room temperature.

Example 13-8

4.3 moles of water were added to a mixed salt in which 0.4 mole of "Compound 12" which was the same as in Example 13-6 and 0.6 mole of "Compound 13" which was the same as in Example 13-6 had been mixed, and the mixture was heated and melted at 50° C. to prepare an electrolyte solution as a saturated aqueous solution of the sodium salts at room temperature.

In FIG. 5, each composition ratio of a sodium salt(s) of Examples 13-2 to 13-8 which are a mixed salt of Compound 12 and Compound 13, Example 13-1 which is a single salt having an asymmetric imide structure of Compound 12, and Comparative example 11 which is a single salt having a symmetric imide structure of Compound 13 as mentioned above and each amount of water necessary for dissolution are shown. The vertical axis of FIG. 5 is the same as in FIG. 4. The horizontal axis represents the molar ratio of Compound 12 based on the total amount of Compound 12 and Compound 13. From FIG. 5, in the mixed salts of Examples 13-2 to 13-8 or the single salt having an asymmetric imide structure of Example 13-1, it was demonstrated that they became an aqueous solution when (number of moles of water)/(number of moles of all sodium salts) was 2.8 to 5.8. On the other hand, it was demonstrated that, in the single salt having a symmetric imide structure of Comparative example 11, it did not become an aqueous solution until (number of moles of water)/(number of moles of all sodium salts) reached 6.3.

Example 14-1

3.50 moles of water were added to 1 mole of a single salt of "Compound 12" as an asymmetric imide containing 5 ppm of a fluorine ion and 7 ppm of hydrogen, respectively, and the mixture was heated and melted at 50° C. to prepare an electrolyte solution as a saturated aqueous solution of a sodium salt at room temperature.

Example 14-2

3.00 moles of water were added to a mixed salt in which 0.9 mole of "Compound 12" which was the same as in Example 13-1 and 0.1 mole of "Compound 15" containing 7 ppm of a fluorine ion and 3 ppm of hydrogen had been mixed, and the mixture was heated and melted at 50° C. to prepare an electrolyte solution as a saturated aqueous solution of the sodium salts at room temperature.

Example 14-3

2.50 moles of water were added to a mixed salt in which 0.8 mole of "Compound 12" which was the same as in Example 13-1 and 0.2 mole of "Compound 15" which was the same as in Example 14-2 had been mixed, and the mixture was heated and melted at 50° C. to prepare an electrolyte solution as a saturated aqueous solution of the sodium salts at room temperature.

Example 14-4

2.25 moles of water were added to a mixed salt in which 0.7 mole of "Compound 12" which was the same as in Example 13-1 and 0.3 mole of "Compound 15" which was the same as Example 14-2 had been mixed, and the mixture was heated and melted at 50° C. to prepare an electrolyte solution as a saturated aqueous solution of the sodium salts at room temperature.

Example 14-5

3.00 moles of water were added to a mixed salt in which 0.5 mole of "Compound 12" which was the same as in Example 13-1 and 0.5 mole of "Compound 15" which was the same as in Example 14-2 had been mixed, and the mixture was heated and melted at 50° C. to prepare an electrolyte solution as a saturated aqueous solution of the sodium salts at room temperature.

Example 14-6

3.50 moles of water were added to a mixed salt in which 0.3 mole of "Compound 12" which was the same as Example 13-1 and 0.7 mole of "Compound 15" which was the same as in Example 14-2 had been mixed, and the mixture was heated and melted at 50° C. to prepare an electrolyte solution as a saturated aqueous solution of the sodium salts at room temperature.

In FIG. 6, each composition ratio of a sodium salt(s) of Examples 14-2 to 14-6 which are a mixed salt of Compound 12 and Compound 15, and Example 14-1 which is a single salt of Compound 12 having an asymmetric imide structure and each amount of water necessary for dissolution are shown. The vertical axis of In FIG. 6 is the same as FIG. 4. The horizontal axis represents the molar ratio of Compound 12 based on the total amount of Compound 12 and Compound 15. From FIG. 6, in the mixed salts of Examples 14-2 to 14-6 or the single salt having an asymmetric imide structure of Example 14-1, it was demonstrated that they became an aqueous solution when (number of moles of water)/(number of moles of all sodium salts) was 2.25 to 3.50.

Example 15

5.00 moles of water were added to a mixed salt in which 0.3 mole of sodium (nonafluorobutanesulfonyl)-(trifluoromethanesulfonyl)imide (($C_4F_9SO_2$)($CF_3SO_2$)NNa) shown as "Compound 14" in Table 2 containing 6 ppm of a fluorine ion and 1 ppm of hydrogen, respectively, as an asymmetric imide and 0.7 mole of "Compound 15" which was the same as in Example 14-2 as a symmetric imide had been mixed, and the mixture was heated and melted at 50° C. to prepare an electrolyte solution as a saturated aqueous solution of the sodium salts at room temperature.

Example 16

2.5 moles of water were added to a mixed salt in which 0.5 mole of "Compound 11" containing 7 ppm of a fluorine ion and 3 ppm of hydrogen, respectively, as an asymmetric imide and 0.5 mole of "Compound 12" containing 5 ppm of a fluorine ion and 7 ppm of hydrogen, respectively, as an asymmetric imide had been mixed, and the mixture was heated and melted at 50° C. to prepare an electrolyte solution as a saturated aqueous solution of the sodium salts at room temperature.

Comparative Example 12

As the symmetric imide, sodium bis(heptafluoro-propanesulfonyl)imide (($C_3F_7SO_2$)$_2$NNa) shown in Table 2 as "Compound 16" and as the symmetric imide, "Compound 13" which was the same as in Example 11-2 were used. 8.6 moles of water were added to a mixed salt in which 0.8 mole of "Compound 16" and 0.2 mole of "Compound 13" had been mixed, and the mixture was heated and melted at 50° C. to prepare an electrolyte solution as a saturated aqueous solution of the sodium salts at room temperature.

<Evaluation Test 2>

The fluorine ion content and hydrogen content in the 26 kinds of electrolyte solutions of Examples 11-1 to 11-7, Comparative example 11, Example 12, Example 13-1 to Example 13-8, Example 14-1 to Example 14-6, Example 15, Example 16 and Comparative example 12, and the Coulombic efficiency (charge/discharge efficiency) of the coin-type sodium ion secondary battery using these electrolyte solutions were measured, respectively. The methods for measuring the fluorine ion content, hydrogen content, and Coulomb efficiency are the same as those for the lithium salts.

In the following Table 5 and Table 6, with regard to 26 kinds of the electrolyte solutions, the kinds and ratios of sodium salts constituting sodium salts of a mixed salt or a sodium salt having an asymmetric imide structure, the molar amount of water per 1 mole of the sodium salt, the total of the fluorine ion content, and the total of the hydrogen content, and the Coulombic efficiency of the secondary battery using 26 kinds of the electrolyte solutions are shown, respectively. The kinds and ratios of the sodium salts constituting the mixed salt or the sodium salts having an asymmetric imide structure are shown as Sodium salt 1 and Sodium salt 2, and the kind and ratio of the sodium salt of sulfonic acid is shown as Sodium salt 3, respectively.

TABLE 5

| | Sodium salt 1 | | Sodium salt 2 | | Sodium salt 3 | | Mole amount of water per 1 mole of sodium salt | Fluorine ion content (ppm) | Hydrogen content (ppm) | Coulombic efficiency (%) |
|---|---|---|---|---|---|---|---|---|---|---|
| | Kind | Ratio | Kind | Ratio | Kind | Ratio | | | | |
| Example 11-1 | Compound 11 | 1 | Compound 13 | — | — | — | 3.5 | 6 | 3 | 97.1 |
| Example 11-2 | Compound 11 | 0.9 | Compound 13 | 0.1 | — | — | 3.2 | 6 | 2 | 97.4 |
| Example 11-3 | Compound 11 | 0.8 | Compound 13 | 0.2 | — | — | 3.1 | 6 | 2 | 97.9 |
| Example 11-4 | Compound 11 | 0.7 | Compound 13 | 0.3 | — | — | 3.9 | 6 | 2 | 97.0 |
| Example 11-5 | Compound 11 | 0.6 | Compound 13 | 0.4 | — | — | 4.4 | 6 | 2 | 96.9 |
| Example 11-6 | Compound 11 | 0.4 | Compound 13 | 0.6 | — | — | 4.8 | 6 | 1 | 96.9 |
| Example 11-7 | Compound 11 | 0.2 | Compound 13 | 0.8 | — | — | 5.4 | 7 | 1 | 96.5 |

TABLE 5-continued

| | Sodium salt 1 | | Sodium salt 2 | | Sodium salt 3 | | Mole amount of water per 1 mole of sodium salt | Fluorine ion content (ppm) | Hydrogen content (ppm) | Coulombic efficiency (%) |
|---|---|---|---|---|---|---|---|---|---|---|
| | Kind | Ratio | Kind | Ratio | Kind | Ratio | | | | |
| Comparative example 11 | Compound 11 | — | Compound 13 | 1 | — | — | 6.3 | 7 | 1 | 96.2 |
| Example 12 | Compound 11 | 0.65 | Compound 13 | 0.14 | Compound 18 | 0.21 | 3.0 | 6 | 2 | 98.1 |
| Example 13-1 | Compound 12 | 1 | Compound 13 | — | — | — | 3.5 | 4 | 6 | 97.6 |
| Example 13-2 | Compound 12 | 0.8 | Compound 13 | 0.2 | — | — | 2.8 | 5 | 5 | 97.8 |
| Example 13-3 | Compound 12 | 0.5 | Compound 13 | 0.5 | — | — | 4.0 | 6 | 4 | 97.4 |
| Example 13-4 | Compound 12 | 0.3 | Compound 13 | 0.7 | — | — | 4.7 | 6 | 3 | 97.4 |
| Example 13-5 | Compound 12 | 0.1 | Compound 13 | 0.9 | — | — | 5.8 | 6 | 1 | 97.1 |
| Example 13-6 | Compound 12 | 0.2 | Compound 13 | 0.8 | — | — | 5.2 | 9 | 13 | 96.9 |
| Example 13-7 | Compound 12 | 0.7 | Compound 13 | 0.3 | — | — | 3.2 | 25 | 9 | 97.6 |
| Example 13-8 | Compound 12 | 0.4 | Compound 13 | 0.6 | — | — | 4.3 | 16 | 11 | 97.3 |

TABLE 6

| | Sodium salt 1 | | Sodium salt 2 | | Sodium salt 3 | | Mole amount of water per 1 mole of sodium salt | Fluorine ion content (ppm) | Hydrogen content (ppm) | Coulombic efficiency (%) |
|---|---|---|---|---|---|---|---|---|---|---|
| | Kind | Ratio | Kind | Ratio | Kind | Ratio | | | | |
| Example 14-1 | Compound 12 | 1 | Compound 15 | — | — | — | 3.50 | 4 | 6 | 97.3 |
| Example 14-2 | Compound 12 | 0.9 | Compound 15 | 0.1 | — | — | 3.00 | 5 | 6 | 97.8 |
| Example 14-3 | Compound 12 | 0.8 | Compound 15 | 0.2 | — | — | 2.50 | 5 | 6 | 98.0 |
| Example 14-4 | Compound 12 | 0.7 | Compound 15 | 0.3 | — | — | 2.25 | 5 | 5 | 98.1 |
| Example 14-5 | Compound 12 | 0.5 | Compound 15 | 0.5 | — | — | 3.00 | 5 | 4 | 97.8 |
| Example 14-6 | Compound 12 | 0.3 | Compound 15 | 0.7 | — | — | 3.50 | 6 | 4 | 97.2 |
| Example 15 | Compound 14 | 0.3 | Compound 15 | 0.7 | — | — | 5.0 | 5 | 2 | 97.0 |

TABLE 6-continued

| | Sodium salt 1 | | Sodium salt 2 | | Sodium salt 3 | | Mole amount of water per 1 mole of sodium salt | Fluorine ion content (ppm) | Hydrogen content (ppm) | Coulombic efficiency (%) |
|---|---|---|---|---|---|---|---|---|---|---|
| | Kind | Ratio | Kind | Ratio | Kind | Ratio | | | | |
| Example 16 | Compound 11 | 0.5 | Compound 12 | 0.5 | — | — | 2.5 | 5 | 5 | 97.9 |
| Comparative example 12 | Compound 16 | 0.8 | Compound 13 | 0.2 | — | — | 8.6 | 6 | 1 | 95.6 |

As is clear from Tables 5 and 6, in Comparative example 11, the sodium salt of the asymmetric imide was not used and only the sodium salt of the symmetric imide was used (1 mole), so that the molar amount of water per 1 mole of the sodium salt was required to be 6.3 moles. The Coulomb efficiency of the secondary battery using this electrolyte solution was not so high as 96.2%.

In Comparative example 12, as the sodium salt of the symmetric imide, the sodium bis(heptafluoropropanesulfonyl)imide ($(C_3F_7SO_2)_2NNa$) of the Compound 16 and the Compound 13 were used, so that the molar amount of water per 1 mole of the sodium salt was required to be 8.6 moles. The Coulomb efficiency of the secondary battery using this electrolyte solution was not so high as 95.6%.

On the other hand, in Example 11-1 to Example 11-7, Example 12, Example 13-1 to Example 13-8, Example 14-1 to Example 14-6, Example 15 and Example 16, the sodium salt is a single salt or a mixed salt having the requirements of the second aspect of the present invention, and its composition ratio satisfies the requirements of the second aspect of the present invention, so that the molar amount of water per 1 mole of the sodium salt is 2 moles or more and less than 6 moles. Therefore, the Coulomb efficiency of the secondary battery using this electrolyte solution was as high as 96.5% to 98.1%.

(4) Confirmation of Potential Window

For the electrolyte solution of Example 11-13, the potential window was confirmed in the same manner as the method in the lithium salt.

The above results are shown in FIG. 7. From the results of FIG. 7, when the potential window of the electrolyte solution of Example 11-13 was a platinum electrode, it was calculated to be 2.6 V, and when the combination of the platinum electrode and the aluminum electrode was calculated to be 3.2 V.

[C] An electrolyte solution using a potassium salt(s) will be described.

Example 21-1

16.0 moles of water were added to 1.0 mole of a single salt of "Compound 21" as an asymmetric imide containing 9 ppm of a fluorine ion and 8 ppm of hydrogen, respectively, and the mixture was heated and melted at 50° C. to prepare an electrolyte solution as a saturated aqueous solution of a potassium salt at room temperature.

Example 21-2

As the symmetric imide, potassium bis(trifluoro-methanesulfonyl)imide ($(CF_3SO_2)_2NK$) shown as "Compound 23" in Table 3 was used. 13.5 moles of water were added to a mixed salt in which 0.8 mole of "Compound 21" which was the same as in Example 21-1 and 0.2 mole of "Compound 23" containing 8 ppm of a fluorine ion and 4 ppm of hydrogen were mixed, and the mixture was heated and melted at 50° C. to prepare an electrolyte solution as a saturated aqueous solution of the potassium salts at room temperature.

Example 21-3

11.0 moles of water were added to a mixed salt in which 0.6 mole of "Compound 21" which was the same as in Example 21-1 and 0.4 mole of "Compound 23" which was the same as in Example 21-2 had been mixed, and the mixture was heated and melted at 50° C. to prepare an electrolyte solution as a saturated aqueous solution of the potassium salts at room temperature.

Example 21-4

22.0 moles of water were added to a mixed salt in which 0.4 mole of "Compound 21" which was the same as in Example 21-1 and 0.6 mole of "Compound 23" which was the same as in Example 21-2 had been mixed, and the mixture was heated and melted at 50° C. to prepare an electrolyte solution as a saturated aqueous solution of the potassium salts at room temperature.

Example 21-5

34.0 moles of water were added to a mixed salt in which 0.2 mole of "Compound 21" which was the same as in Example 21-1 and 0.8 mole of "Compound 23" which was the same as in Example 21-2 had been mixed, and the mixture was heated and melted at 50° C. to prepare an electrolyte solution as a saturated aqueous solution of the potassium salts at room temperature.

Example 21-6

13.5 moles of water were added to a mixed salt in which 0.8 mole of "Compound 21" containing 26 ppm of a fluorine ion and 11 ppm of hydrogen, respectively, and 0.2 mole of "Compound 23" containing 12 ppm of a fluorine ion and 30 ppm of hydrogen, respectively, had been mixed, and the mixture was heated and melted at 50° C. to prepare an electrolyte solution as a saturated aqueous solution of the potassium salts at room temperature.

Example 21-7

11.0 moles of water were added to a mixed salt in which 0.6 mole of "Compound 21" which was the same as in Example 21-6 and 0.4 mole of "Compound 23" which was the same as in Example 21-6 had been mixed, and the mixture was heated and melted at 50° C. to prepare an electrolyte solution as a saturated aqueous solution of the potassium salts at room temperature.

Example 21-8

22.0 moles of water were added to a mixed salt in which 0.4 mole of "Compound 21" which was the same as in Example 21-6 and 0.6 mole of "Compound 23" which was the same as in Example 21-6 had been mixed, and the mixture was heated and melted at 50° C. to prepare an electrolyte solution as a saturated aqueous solution of the potassium salts at room temperature.

Comparative Example 21

42.0 moles of water were added to 1 mole of a single salt of "Compound 23" which was a potassium salt having the same symmetric imide structure as in Example 21-2, and the mixture was heated and melted at 50° C. to prepare an electrolyte solution as a saturated aqueous solution of the potassium salts at room temperature.

In FIG. 8, the composition ratio of a potassium salt(s) and the amount of water necessary for dissolution of Examples 21-2 to 21-5, which is a mixed salt of Compound 21 and Compound 23, Example 21-1, which is a single salt of Compound 21, and Comparative example 21 which is a single salt of Compound 23 are shown. In FIG. 8, the vertical axis shows (number of moles of water)/(number of moles of all potassium salts), and the horizontal axis shows the molar ratio of Compound 21 based on the total amount of Compound 21 and Compound 23. From FIG. 8, in the mixed salts of Examples 21-2 to 21-5 or the single salt having the asymmetric imide structure of Example 21-1, it was demonstrated that they became an aqueous solution when the (number of moles of water)/(number of moles of all potassium salts) was 11.0 to 34.0. On the other hand, it was demonstrated that the single salt having a symmetric imide structure of Comparative example 21 did not become an aqueous solution until the (number of moles of water)/(number of moles of all potassium salts) reached 42.0.

Example 22

2.0 moles of water were added to a mixed salt in which 0.12 mole of "Compound 21" which was the same as in Example 21-1, 0.08 mole of "Compound 23" which was the same as in Example 21-2, and 0.8 mole of "Compound 28" as potassium sulfonate containing 8 ppm of a fluorine ion and 3 ppm of hydrogen, respectively, and the mixture was heated and melted at 50° C. to prepare an electrolyte solution as a saturated aqueous solution of the potassium salts at room temperature.

Example 23-1

6.0 moles of water were added to 1 mole of a single salt of "Compound 22" as an asymmetric imide containing 7 ppm of a fluorine ion and 7 ppm of hydrogen, respectively, and the mixture was heated and melted at 50° C. to prepare an electrolyte solution as a saturated aqueous solution of a potassium salt at room temperature.

Example 23-2

4.0 moles of water were added to a mixed salt in which 0.8 mole of "Compound 22" which was the same as in Example 23-1 and 0.2 mole of "Compound 23" which was the same as in Example 21-2 had been mixed, and the mixture was heated and melted at 50° C. to prepare an electrolyte solution as a saturated aqueous solution of the potassium salts at room temperature.

Example 23-3

3.0 moles of water were added to a mixed salt in which 0.6 mole of "Compound 22" which was the same as in Example 23-1 and 0.4 mole of the same "Compound 23" which was the same as in Example 21-2 had been mixed, and the mixture was heated and melted at 50° C. to prepare an electrolyte solution as a saturated aqueous solution of the potassium salts at room temperature.

Example 23-4

9.0 moles of water were added to a mixed salt in which 0.4 mole of "Compound 22" which was the same as in Example 23-1 and 0.6 mole of "Compound 23" which was the same as in Example 21-2 had been mixed, and the mixture was heated and melted at 50° C. to prepare an electrolyte solution as a saturated aqueous solution of the potassium salts at room temperature.

Example 23-5

18.0 moles of water were added to a mixed salt in which 0.2 mole of "Compound 22" which was the same as in Example 23-1 and 0.8 mole of "Compound 23" which was the same as in Example 21-2 had been mixed, and the mixture was heated and melted at 50° C. to prepare an electrolyte solution as a saturated aqueous solution of the potassium salts at room temperature.

In FIG. 9, each composition ratio of the potassium salt(s) of Examples 23-2 to 23-5 which are mixed salts of Compound 22 and Compound 23, Examples 23-1 which are a single salt of the asymmetric imide structure of Compound 22, and Comparative example 21 which is a single salt having the above-mentioned symmetric imide structure of Compound 23, and the amount of water necessary for dissolution are shown. The vertical axis of FIG. 9 is the same as that of FIG. 8. The horizontal axis shows the molar ratio of Compound 22 based the total amount of Compound 22 and Compound 23. From FIG. 9, in the mixed salt of Examples 23-2 to 23-5 or the single salt having the asymmetric imide structure of Example 23-1, it was demonstrated that they became an aqueous solution when the (number of moles of water)/–(number of moles of all potassium salts) was 3.0 to 18.0. On the other hand, it was demonstrated that the single salt having a symmetric imide structure of Comparative example 21 did not become an aqueous solution until the (number of moles of water)/(number of moles of all potassium salts) reached 42.0.

Example 24

38.0 moles of water were added to a mixed salt in which 0.2 mole of "Compound 21" which was the same as in Example 21-1, 0.2 mole of potassium (nonafluorobutanesulfonyl) (trifluoromethanesulfonyl)imide (($C_4F_9SO_2$)—($CF_3SO_2$)NK) (Compound 24) shown as "Compound 24" in Table 3 containing 8 ppm of a fluorine ion and 9 ppm of hydrogen, respectively, as asymmetric imides, and 0.6 mole of potassium bis(pentafluoroethanesulfonyl)imide (($C_2F_5SO_2$)$_2$NK) shown as "Compound 25" in Table 3 containing 6 ppm of a fluorine ion and 1 ppm of hydrogen, respectively, as symmetric imides had been mixed, and the mixture was heated and melted at 50° C. to prepare an electrolyte solution as a saturated aqueous solution of the potassium salts at room temperature.

Example 25

2.5 moles of water were added to a mixed salt in which 0.5 mole of "Compound 21" which was the same as in Example 21-1 and 0.5 mole of "Compound 22" which was the same as in Example 23-1 had been mixed, and the mixture was heated and melted at 50° C. to prepare an electrolyte solution as a saturated aqueous solution of the potassium salts at room temperature.

Comparative Example 22

As the asymmetric imide, the same "Compound 22" as in Example 23-1, and as the symmetric imide, potassium bis(heptafluoropropanesulfonyl)imide (($C_3F_7SO_2$)$_2$NK) shown as "Compound 26" in Table 3 containing 8 ppm of a fluorine ion and 4 ppm of hydrogen, respectively, was used. 120.0 mole of water was added to a mixed salt in which 0.3 mole of "Compound 22" and 0.7 mole of "Compound 26" had been mixed, and the mixture was heated and melted at 50° C. to prepare an electrolyte solution as a saturated aqueous solution of the potassium salts at room temperature.

<Evaluation Test 3>

18 kinds of the fluorine ion content and the hydrogen content in the electrolyte solutions of Examples 21-1 to 21-8, Comparative example 21, Example 22, Example 23-1 to Example 23-5, Example 24, Example 25 and Comparative example 22, and the Coulombic efficiency (charge/discharge efficiency) of the coin-type potassium ion secondary battery using these electrolyte solutions were measured, respectively. The methods for measuring the fluorine ion content, hydrogen content, and Coulomb efficiency are the same as those for the lithium salts.

In the following Table 7, with regard to 18 kinds of the electrolyte solutions, the kinds and ratios of potassium salts constituting the mixed salts or the potassium salts having an asymmetric imide structure, the molar amounts of water per 1 mole of the potassium salts, the fluorine ion content and the hydrogen content, and the Coulomb efficiency of the secondary battery using 18 kinds of electrolyte solutions are shown, respectively. The kinds and ratios of the potassium salts constituting the mixed salt or the potassium salts having an asymmetric imide structure are shown as Potassium salt 1 and Potassium salt 2, and Compound 25 constituting the potassium salt having a symmetric imide structure and Compound 28 which is the sulfonic acid potassium salt are shown as Potassium salt 3, respectively.

TABLE 7

| | Potassium salt 1 | | Potassium salt 2 | | Potassium salt 3 | | Mole amount of water per 1 mole of potassium salt | Fluorine ion content (ppm) | Hydrogen content (ppm) | Coulombic efficiency (%) |
| --- | --- | --- | --- | --- | --- | --- | --- | --- | --- | --- |
| | Kind | Ratio | Kind | Ratio | Kind | Ratio | | | | |
| Example 21-1 | Compound 21 | 1 | Compound 23 | — | — | — | 16.0 | 5 | 4 | 97.3 |
| Example 21-2 | Compound 21 | 0.8 | Compound 23 | 0.2 | — | — | 13.5 | 5 | 4 | 97.5 |
| Example 21-3 | Compound 21 | 0.6 | Compound 23 | 0.4 | — | — | 11.0 | 6 | 4 | 97.8 |
| Example 21-4 | Compound 21 | 0.4 | Compound 23 | 0.6 | — | — | 22.0 | 4 | 3 | 95.8 |
| Example 21-5 | Compound 21 | 0.2 | Compound 23 | 0.8 | — | — | 34.0 | 3 | 2 | 94.3 |
| Example 21-6 | Compound 21 | 0.8 | Compound 23 | 0.2 | — | — | 13.5 | 14 | 9 | 96.4 |
| Example 21-7 | Compound 21 | 0.6 | Compound 23 | 0.4 | — | — | 11.0 | 13 | 11 | 96.2 |
| Example 21-8 | Compound 21 | 0.4 | Compound 23 | 0.6 | — | — | 22.0 | 8 | 10 | 96.8 |
| Comparative example 21 | Compound 21 | — | Compound 23 | 1 | — | — | 42.0 | 2 | 1 | 90.3 |
| Example 22 | Compound 21 | 0.12 | Compound 23 | 0.08 | Compound 28 | 0.8 | 2.0 | 7 | 4 | 98.8 |

TABLE 7-continued

|  | Potassium salt 1 | | Potassium salt 2 | | Potassium salt 3 | | Mole amount of water per 1 mole of potassium salt | Fluorine ion content (ppm) | Hydrogen content (ppm) | Coulombic efficiency (%) |
| --- | --- | --- | --- | --- | --- | --- | --- | --- | --- | --- |
|  | Kind | Ratio | Kind | Ratio | Kind | Ratio |  |  |  |  |
| Example 23-1 | Compound 22 | 1 | Compound 23 | — | — | — | 6.0 | 6 | 6 | 98.1 |
| Example 23-2 | Compound 22 | 0.8 | Compound 23 | 0.2 | — | — | 4.0 | 6 | 6 | 98.4 |
| Example 23-3 | Compound 22 | 0.6 | Compound 23 | 0.4 | — | — | 3.0 | 6 | 5 | 98.5 |
| Example 23-4 | Compound 22 | 0.4 | Compound 23 | 0.6 | — | — | 9.0 | 5 | 4 | 97.0 |
| Example 23-5 | Compound 22 | 0.2 | Compound 23 | 0.8 | — | — | 18.0 | 4 | 2 | 97.0 |
| Example 24 | Compound 21 | 0.2 | Compound 24 | 0.2 | Compound 25 | 0.6 | 38.0 | 3 | 2 | 94.2 |
| Example 25 | Compound 21 | 0.5 | Compound 22 | 0.5 | — | — | 2.5 | 7 | 7 | 98.5 |
| Comparative example 22 | Compound 22 | 0.3 | Compound 26 | 0.7 | — | — | 120.0 | 1 | 1 | 76.8 |

As is clear from Table 7, in Comparative example 21, the potassium salt of the asymmetric imide was not used and only the potassium salt of the symmetric imide was used (1 mole), so that the molar amount of water per 1 mole of the potassium salt was required to be 42.0 moles. The Coulomb efficiency of the secondary battery using this electrolyte solution was not as high as 90.3%.

In Comparative example 22, the potassium bis(heptafluoropropanesulfonyl)imide (($C_3F_7SO_2$)$_2$NK) of Compound 26 was used as the potassium salt of the symmetric imide, so that the molar amount of water per 1 mole of the potassium salt was required to be 120.0 moles. The Coulomb efficiency of the secondary battery using this electrolyte solution was not so high as 76.8%.

On the other hand, in Examples 21-1 to 21-8, Example 22, Example 23-1 to Example 23-5, Examples 24 and 25, the potassium salt is a single salt or a mixed salt having the requirements of the third aspect of the present invention, and its composition ratio satisfies the requirements of the third aspect of the present invention, so that the molar amount of water per 1 mole of the potassium salt is 2 moles or more and less than 40 moles. Therefore, the Coulomb efficiency of the secondary battery using these electrolyte solutions was as high as 94.2% to 98.8%.

(4) Confirmation of Potential Window

For the electrolyte solution of Example 22, the potential window was confirmed in the same manner as the method in the lithium salt.

The above results are shown in FIG. 10. From the results of FIG. 10, when the potential window of the electrolyte solution of Example 22 was a platinum electrode, it was calculated to be 2.4 V, and when the combination of the platinum electrode and the aluminum electrode was calculated to be 3.1 V.

INDUSTRIAL APPLICABILITY

The aqueous electrolyte of the present invention can be used for energy storage devices such as lithium ion secondary batteries, sodium ion secondary batteries, potassium ion secondary batteries, electric double layer capacitors, lithium ion capacitors, sodium ion capacitors or potassium ion capacitors.

The invention claimed is:

1. An aqueous electrolyte solution for an energy storage device containing water as a solvent, wherein:
   an electrolyte is a lithium salt of an asymmetric imide having a perfluoroalkyl group, or a mixed salt of a lithium salt of an asymmetric imide having a perfluoroalkyl group and a lithium salt of a symmetric imide having a perfluoroalkyl group,
   a composition ratio of the mixed salt is, in a molar ratio, (lithium salt of asymmetric imide)$_x$(lithium salt of symmetric imide)$_{1-x}$, where x is 0.1 or more and less than 1.0,
   in a case where the electrolyte is the lithium salt of the asymmetric imide, the lithium salt of the asymmetric imide is lithium (heptafluoropropanesulfonyl)(trifluoromethanesulfonyl)imide (($C_3F_7SO_2$)($CF_3SO_2$)NLi),
   in a case where the electrolyte is the mixed salt,
   the lithium salt of the asymmetric imide is
     lithium (heptafluoro-propanesulfonyl) (trifluoromethanesulfonyl)imide (($C_3F_7SO_2$)($CF_3SO_2$)NLi), and
   the lithium salt of the symmetric imide is
     lithium bis(trifluoromethanesulfonyl)imide (($CF_3SO_2$)$_2$NLi), and
   the composition of the electrolyte solution is 1.0 mole or more and less than 2 moles of an amount of the solvent per 1 mole of the lithium salt of the asymmetric imide or the lithium salts of the mixed salt.

2. The aqueous electrolyte solution for an energy storage device according to claim 1, wherein a melting point of one kind or two kinds of the lithium salts is 230° C. or lower.

3. The aqueous electrolyte solution for an energy storage device according to claim 1, wherein a fluorine ion content in the aqueous electrolyte solution is 10 ppm or less, and a hydrogen content in the aqueous electrolyte solution is 10 ppm or less, the hydrogen in the aqueous electrolyte solution is a hydrogen atom which remains in a molecule of the lithium salt of the imide where the lithium salt is not completely fluorinated, in a case where the electrolyte is the lithium salt of the asymmetric imide, the lithium salt is the lithium salt of the asymmetric imide, and in a case where the electrolyte is the mixed salt, the lithium salt is both of the lithium salt of the asymmetric imide and the lithium salt of the symmetric imide.

4. The aqueous electrolyte solution for an energy storage device according to claim 1, wherein the energy storage device is a lithium ion secondary battery, an electric double layer capacitor or a lithium ion capacitor.

5. An energy storage device containing the aqueous electrolyte device according to claim 1.

* * * * *